(12) United States Patent
Wasnik et al.

(10) Patent No.: US 12,333,794 B2
(45) Date of Patent: Jun. 17, 2025

(54) EMOTION RECOGNITION IN MULTIMEDIA VIDEOS USING MULTI-MODAL FUSION-BASED DEEP NEURAL NETWORK

(71) Applicant: SONY GROUP CORPORATION, Tokyo (JP)

(72) Inventors: Pankaj Wasnik, Bangalore (IN); Naoyuki Onoe, Bangalore (IN); Vishal Chudasama, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/941,787

(22) Filed: Sep. 9, 2022

(65) Prior Publication Data

US 2023/0154172 A1    May 18, 2023

Related U.S. Application Data

(60) Provisional application No. 63/263,961, filed on Nov. 12, 2021.

(51) Int. Cl.
*G06V 10/82* (2022.01)
*G06V 10/22* (2022.01)
(Continued)

(52) U.S. Cl.
CPC .............. *G06V 10/82* (2022.01); *G06V 10/22* (2022.01); *G06V 10/44* (2022.01); *G06V 10/806* (2022.01);
(Continued)

(58) Field of Classification Search
CPC ........ G06V 10/82; G06V 10/22; G06V 10/44; G06V 10/806; G06V 40/174;
(Continued)

(56) References Cited

U.S. PATENT DOCUMENTS 10,789,755 B2 *  9/2020  Amer ..................... G06V 20/41
11,281,945 B1 *  3/2022  Tao ....................... G06V 10/766
(Continued)

FOREIGN PATENT DOCUMENTS

CN    109978884 B    6/2020
CN    112560830 B    5/2021
(Continued)

*Primary Examiner* — Ali Bayat
(74) *Attorney, Agent, or Firm* — CHIP LAW GROUP

(57) ABSTRACT

A system and method of landmark detection using emotion recognition in multimedia videos using multi-modal fusion based deep neural network is provided. The system includes circuitry and a memory configured to store a multimodal fusion network which includes one or more feature extractors, a network of transformer encoders, a fusion attention network, and an output network coupled to the fusion attention network. The system inputs a multimodal input to the one or more feature extractors. The multimodal input is associated with an utterance depicted in one or more videos. The system generates input embeddings as an output of the one or more feature extractors for the input and further generates a set of emotion-relevant features based on the input embeddings. The system further generates a fused-feature representation of the set of emotion-relevant features and predicts an emotion label for the utterance based on fused-feature representation.

20 Claims, 8 Drawing Sheets

(51) Int. Cl.
*G06V 10/44* (2022.01)
*G06V 10/80* (2022.01)
*G06V 40/16* (2022.01)
*G10L 15/26* (2006.01)
*G10L 25/63* (2013.01)

(52) U.S. Cl.
CPC ............ *G06V 40/174* (2022.01); *G10L 15/26* (2013.01); *G10L 25/63* (2013.01)

(58) Field of Classification Search
CPC .... G06V 10/811; G06V 40/161; G10L 15/26; G10L 25/63; G10L 17/26; G10L 15/24; G06N 3/0455; G06N 3/0475; G06N 3/0985; G06N 3/0442; G06N 3/0464; G06F 40/58; G06F 40/30
USPC ........................................................ 382/157
See application file for complete search history.

(56) References Cited

U.S. PATENT DOCUMENTS

| | | | |
|---|---|---|---|
| 11,417,318 B2* | 8/2022 | Reece | G10L 15/22 |
| 11,417,330 B2* | 8/2022 | Reece | G06N 3/045 |
| 2020/0298873 A1 | 9/2020 | Provost | |
| 2021/0012770 A1* | 1/2021 | Choudhary | G10L 15/22 |
| 2021/0264900 A1 | 8/2021 | Reece | |
| 2022/0187847 A1* | 6/2022 | Cella | G06Q 10/06 |
| 2022/0310094 A1* | 9/2022 | Nguyen | G06N 3/04 |

FOREIGN PATENT DOCUMENTS

| | | |
|---|---|---|
| CN | 112949684 A | 6/2021 |
| CN | 113420807 A | 9/2021 |
| EP | 3813376 A1 | 4/2021 |
| WO | 2021/135457 A1 | 7/2021 |
| WO | WO-2021134277 A1 | 7/2021 |

* cited by examiner

EMOTION RECOGNITION IN MULTIMEDIA VIDEOS USING MULTI-MODAL FUSION-BASED DEEP NEURAL NETWORK

CROSS-REFERENCE TO RELATED APPLICATIONS/INCORPORATION BY REFERENCE

This application claims priority to U.S. Provisional Patent Application Ser. No. 63/263,961 filed on Nov. 12, 2021, the entire content of which is hereby incorporated herein by reference.

FIELD

Various embodiments of the disclosure relate to neural networks and emotion recognition. More specifically, various embodiments of the disclosure relate to a system and method for emotion recognition in multimedia videos using multi-modal fusion-based deep neural network.

BACKGROUND

Advancements in computer vision and artificial intelligence have led to development of various kinds of neural networks (or models) that may be used in different applications, such as emotion recognition in conversations. Typically, emotion recognition is used to predict an emotional state of a speaker from conversation(s) depicted in multimedia videos (for example, movies, web-series, news, and the like). Emotion recognition is crucial in the development of sympathetic human machine systems. In case of conversations, traditional approaches for emotion recognition mostly rely on a text transcript of the conversation. Any inaccuracy in the text transcript may affect accuracy of predictions (e.g., an emotion label). Many state-of-the-art techniques for emotion recognition disregard vast amount of information present in the visual and acoustic signals associated with a conversation.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for emotion recognition in multimedia videos using multi-modal fusion-based deep neural network is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
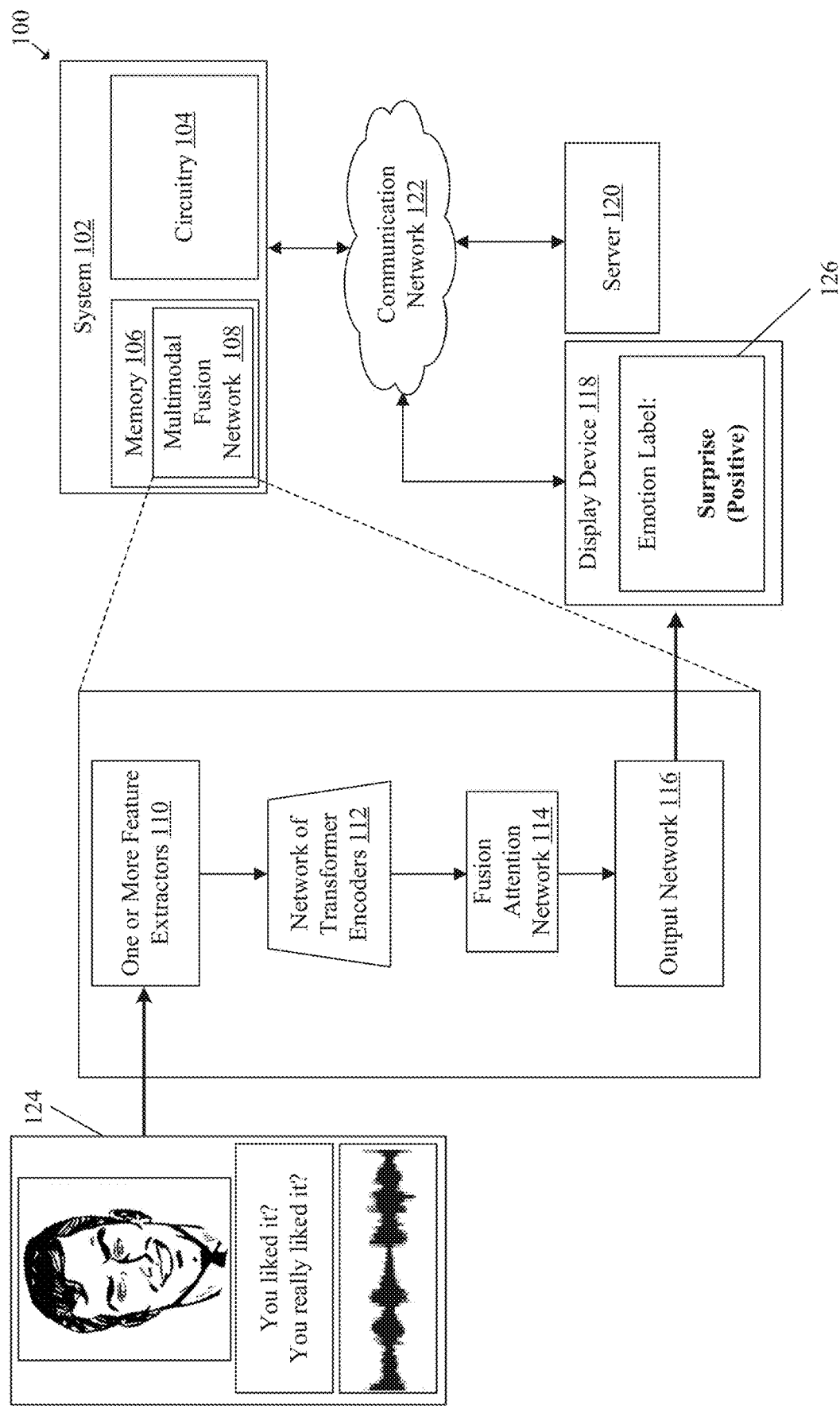
FIG. 1 is a diagram that illustrates a network environment for emotion recognition in multimedia videos using multimodal fusion-based deep neural network, in accordance with an embodiment of the disclosure.

The following described implementations may be found in a disclosed system and method for emotion recognition in multimedia videos using multi-modal fusion-based deep neural network. The system includes circuitry and memory configured to store a multimodal fusion network which includes one or more feature extractors, a network of transformer encoders coupled to the one or more feature extractors, a fusion attention network coupled to the network of transformer encoders, and an output network coupled to the fusion attention network. The system may input a multimodal input to the one or more feature extractors. The multimodal input may be associated with an utterance depicted in one or more videos (such as movies). The system may generate input embeddings as output of the one or more feature extractors for the input. The input embeddings may include an embedding for each modality of the multimodal input. The system may further generate a set of emotion-relevant features based on application of the network of transformer encoders on the input embeddings. The set of emotion-relevant features include one or more features corresponding to each modality of the multimodal input. The system may further generate a fused-feature representation of the set of emotion-relevant features based on application of the fusion attention network on the set of emotion-relevant features. Based on application of the output network on the fused-feature representation, the system may predict an emotion label (such as angry, neutral, happy, sad etc.) for the utterance.

Emotions can be described as unseen mental states that may be linked to thoughts and feelings of a subject (a person). In the absence of physiological indications, emotions can only be detected by human actions such as textual utterances, visual gestures, and acoustic signals. Emotion recognition in conversations seeks to recognize the subject's emotions in conversations depending on their textual, visual, and acoustic cues. Currently, emotion recognition in conservation has become an essential task in context of multimedia content (such as videos) analysis and moderation, helping to understand the nature of the interaction between users and the content. Emotion recognition in conversations has other important applications in many other tasks such as AI interviews, personalized dialogue systems, opinion mining over chat history, and understanding the user perception of content in social media platforms.

Current state of the art methods for emotion recognition frames the task of emotion recognition in conversations as purely a text-based task. Specifically, the current state of the art methods for emotion recognition in conversations determines an emotional state of a subject based on textual data associated with the subject. The textual data may correspond to transcription of audio spoken by the subject. However, vast amount of information present in the acoustic and visual modalities of multimedia content is not considered in determination of emotional state of the subject.

The present disclosure provides a neural network architecture that uses at least three different modalities (acoustic modality, textual modality, and visual modality) associated with the utterances to detect the emotional state of subject. Based on experimental data, a proper fusion of three modalities may improve the quality and robustness of the current state of the art systems. The disclosed system may take each modality that contributes to emotion predictions as an input and detects the emotional state of the subject. The disclosed method may be more generalized as compared to the current state of the art methods.

The present disclosure may also provide an acoustic-visual feature extractor that may be designed based on a triplet network to leverage the importance of triplet loss function. The acoustic-visual feature extractor is trained on the triple loss function which includes an adaptive margin triplet loss function, a covariance loss function, and a variance loss function.

FIG. 1 is a diagram that illustrates a network environment for emotion recognition in multimedia videos using multimodal fusion based-deep neural network, in accordance with an embodiment of the disclosure. With reference to FIG. 1, there is shown a diagram of a network environment 100. The network environment 100 includes a system 102. The system 102 includes circuitry 104 and memory 106. The memory may include a multimodal fusion network 108. The multimodal fusion network 108 may include one or more feature extractors 110, a network of transformer encoders 112, a fusion attention network 114, and an output network 116. With reference to FIG. 1, there is further shown a display device 118, a server 120, and a communication network 122. With reference to FIG. 1, there is also shown a multimodal input 124 and a predicted emotion label 126 displayed on the display device 118.

The circuitry 104 may include suitable logic, circuitry, and interfaces that may be configured to execute program instructions associated with different operations to be executed by the system 102. The circuitry 104 may be implemented based on a number of processor technologies known in the art. Examples of the processor technologies may include, but are not limited to, a Central Processing Unit (CPU), an x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor (such as an inference accelerator or an Artificial Intelligence (AI) accelerator), and/or a combination thereof.

The memory 106 may include suitable logic, circuitry, and/or interfaces that may be configured to store the program instructions executable by the circuitry 104. The memory 106 may also store the multimodal fusion network 108. In at least one embodiment, the memory 106 may also store input data for the multimodal fusion network 108, intermediate results obtained using the multimodal input embeddings, emotion label(s) predicted by the multimodal fusion network 108. Examples of implementation of the memory 106 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The multimodal fusion network 108 may be a computational network or a system of artificial neurons arranged in a plurality of layers. The multimodal fusion network 108 may be trained to predict an emotion label (e.g., the emotion label 126) for the utterance depicted in the one or more videos (i.e., emotion recognition in conversations).

The multimodal fusion network 108 includes the one or more feature extractors 110, the network of transformer encoders 112 coupled to the one or more feature extractors 110, the fusion attention network 114 coupled to the network of transformer encoders 112, and the output network 116 coupled to the fusion attention network 114. Operations of the multimodal fusion network 108 may be divided into two stages. In the first stage (i.e., utterance level), features may be extracted at an utterance level independently. Thereafter, in the second stage (i.e., dialogue level), the network may learn to predict an emotion label for each utterance by using contextual information from a dialog. An utterance may correspond to a short oral segment that may be spoken by one of the parties in a multi-party conversation and may have a text transcript, a video clip, and an audio segment. A dialogue may include multiple utterances in an order in which such utterances occurred in time.

Each of the one or more feature extractors 110 may be configured to perform one or more operations for generation of input embeddings for each modality of a multimodal input (e.g., the multimodal input 124). Each encoder of the network of transformer encoders 112 may be configured to perform one or more operations for generation of the set of emotion-relevant features. The fusion attention network 114 may be configured to generate a fused-feature representation of the set of emotion-relevant features. Specifically, the fusion attention network 114 may be configured to generate the fused-feature representation based on application of one or more multi-head attention operations on the set of emotion-relevant features. The output network 116 may be configured to predict the emotion label 126 for the utterance associated with the multimodal input 124. The output network 116 may predict the emotion label 126 based on the fused-feature representation. The output network 116 may include a fully connected layer that may be configured to predict the emotion label 126. Details about the output network 116 are provided, for example, in FIG. 3.

Each of the one or more feature extractors 110, each encoder of the network of transformer encoders 112, the fusion attention network 114, and the output network 116 may be a neural network or a system of artificial neurons that may be arranged in a plurality of layers. The plurality of layers of the neural network may include an input layer, one or more hidden layers, and an output layer. Each layer of the plurality of layers may include one or more nodes (i.e., artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset. For the multimodal fusion network 108, the training dataset may include a set of multimodal inputs and corresponding emotion labels as ground truth values. Each multimodal input may include at least one of an audio of an utterance, one or more frames of a scene in one or more characters produce the utterance, and a text transcript of the audio.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different mathematical function.

In training of the neural network, one or more parameters of each node of the neural network may be updated based on whether an output of the final layer for a given input (from the training dataset) matches a correct result based on a loss function for the neural network. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

Each of the one or more feature extractors 110, each encoder of the network of transformer encoders 112, the fusion attention network 114, and the output network 116 may include electronic data, which may be implemented as, for example, a software component of an application executable on the system 102. Each of the one or more feature extractors 110, each encoder of the network of transformer encoders 112, the fusion attention network 114, and the output network 116 may rely on libraries, external scripts, or other logic/instructions for execution by a processing device, such as the circuitry 104. Each encoder of the network of transformer encoders 112, the fusion attention network 114, and the output network 116 may include code and routines configured to enable a computing device, such as the circuitry 104 to perform one or more operations. For example, each of the one or more feature extractors 110 may perform one or more operations for generation of input embeddings for each modality of the received multimodal input 124. Each encoder of the network of transformer encoders 112 may perform one or more operations for generation of the set of emotion-relevant features. Additionally, or alternatively, each of the one or more feature extractors 110, each encoder of the network of transformer encoders 112, the fusion attention network 114, and the output network 116 may be implemented using hardware including a processor, a microprocessor (e.g., to perform or control performance of one or more operations), a Tensor Processing Unit (TPU), a field-programmable gate array (FPGA), or an application-specific integrated circuit (ASIC). Alternatively, in some embodiments, each of the one or more feature extractors 110, each encoder of the network of transformer encoders 112, the fusion attention network 114, and the output network 116 may be implemented using a combination of hardware and software.

In an embodiment, each encoder of the network of transformer encoders 112 may be configured to receive input embeddings for each modality as an input in parallel (i.e., simultaneously) and provide the set of emotion-relevant features as the output simultaneously. By way of example, and not limitation, each encoder may include a multi-head attention layer, and a feed forward neural network.

In an embodiment, the fusion attention network 114 may be used to incorporate the visual modality and the acoustic modality with the text modality associated with the utterance. The fusion attention network 114 may include one or more multi-head attention layers and a first fully connected layer. Details about the fusion attention network are provided, for example, in FIG. 5.

The display device 118 may include suitable logic, circuitry, and interfaces that may be configured to display the emotion label 126 for the utterance associated with the multimodal input 124. In an embodiment, the display device 118 may be configured to display the multimodal input 124 and the emotion label 126 corresponding to an utterance level portion of the multimodal input 124. The display device 118 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 118 may refer to a display screen of a head mounted device (HMD), a smart-glass device, a see-through display, a projection-based display, an electro-chromic display, or a transparent display.

In another embodiment, the display device 118 may include suitable logic, circuitry, interfaces, and/or code that may to implement the multimodal fusion network 108 as part of a software program or a service (such as an Application Programming Interface (API)-based service) executable on the display device 118. The multimodal fusion network 108 may be implemented on the display device 118 after the training of the multimodal fusion network 108 is over on the system 102. Examples of the display device 118 may include, but are not limited to, a computing device, a mainframe machine, a server, a computer workstation, a smartphone, a cellular phone, a mobile phone, a gaming device, a wearable display, a consumer electronic (CE) device, and/or any other device with image processing capabilities.

The server 120 may include suitable logic, circuitry, and interfaces, and/or code that may be configured to store one or more videos for the purpose of emotion recognition and other operations, such as a media streaming operation. The server 120 may be configured to also store the emotion label 126 that may be predicted or an utterance-level portion of a video. The server 120 may be implemented as a cloud server and may execute operations through web applications, cloud applications, HTTP requests, repository operations, file transfer, and the like. Other example implementations of the server 120 may include, but are not limited to, a media server, a database server, a file server, a web server, an application server, a mainframe server, or a cloud computing server.

In at least one embodiment, the server 120 may be implemented as a plurality of distributed cloud-based resources by use of several technologies that are well known to those ordinarily skilled in the art. A person with ordinary skill in the art will understand that the scope of the disclosure may not be limited to the implementation of the server 120 and the system 102 as two separate entities. In certain embodiments, the functionalities of the server 120 can be incorporated in its entirety or at least partially in the system 102, without a departure from the scope of the disclosure.

The communication network 122 may include a communication medium through which the system 102, the display device 118, and the server 120 may communicate with each other. The communication network 122 may include one of a wired connection or a wireless connection. Examples of the communication network 122 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 122 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the circuitry 104 may be configured to input the multimodal input 124 to the one or more feature extractors 110. The multimodal input may be associated with an utterance depicted in one or more videos. For example, the multimodal input may include a first modality associated with acoustics of the utterance, a second modality associated with a text transcript of the utterance, and a third modality associated with a visual aspect of the utterance. In an embodiment, the multimodal input may further include a fourth modality that may be associated with one or more biological parameters of a subject (i.e., the speaker) associated with the corresponding utterance.

The circuitry 104 may be configured to generate input embeddings as output of the one or more feature extractors 110 for the input. The input embeddings may include an embedding for each modality of the multimodal input 124. In an embodiment, the input embedding may correspond to features of the corresponding modality. More specifically, the input embedding may be referred to as low-dimensional, learned continuous vector representations of discrete variables. Based on the generation of input embeddings, the circuitry 104 may be further configured to generate a set of emotion-relevant features based on application of the network of transformer encoders 112 on the input embeddings. In an embodiment, the network of transformer encoders 112 may be applied on the input embeddings to learn context of the corresponding utterance with respect to each modality. The set of emotion-relevant features may include one or more features corresponding to each modality of the multimodal input 124. Details about the set of emotion-relevant features are provided, for example, in FIG. 3.

To map each modality into a corresponding text vector space, the circuitry may be configured to apply the fusion attention network 114 on the set of emotion-relevant features. In another embodiment, the fusion attention network 114 may be used to incorporate the visual and acoustic information associated with the dialog. Specifically, the circuitry 104 may be further configured to generate a fused-feature representation of the set of emotion-relevant features based on application of the fusion attention network 114 on the set of emotion-relevant features. Details about the used-feature representation are provided, for example, in FIG. 3.

After the generation of the fused-feature representation, the circuitry 104 may be configured to predict the emotion label 126 for the utterance associated with the multimodal input 124. The emotion label 126 may be predicted based on application of the output network 116 on the fused-feature representation. In an embodiment, the circuitry 104 may be further configured to control the display device 118 to render the predicted emotion label 126 on the display device 118. Details about the emotion label 126 and the prediction of the emotion label 126 are provided, for example, in FIG. 3.

Figure 2:
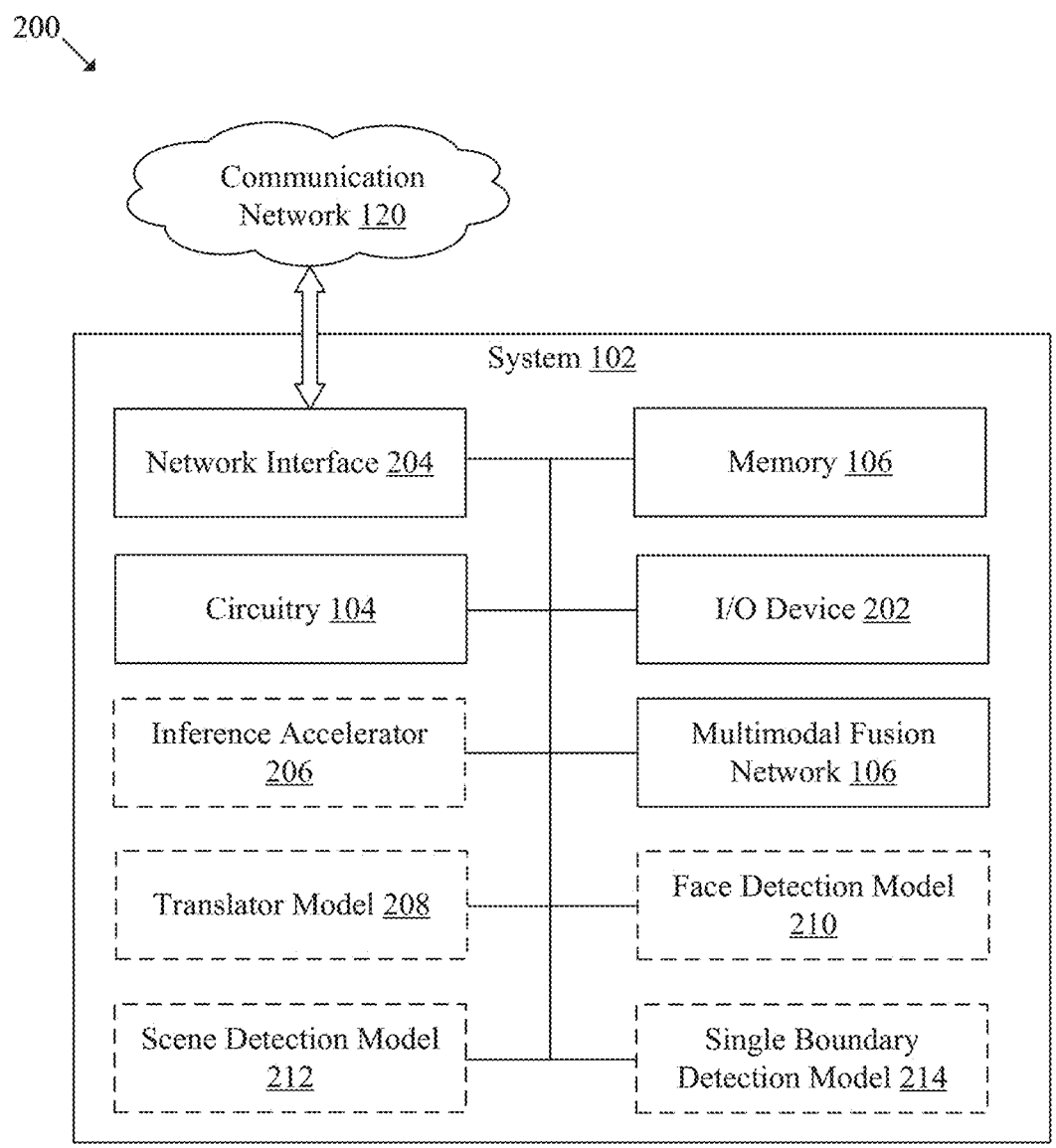
FIG. 2 is a block diagram of an exemplary system for emotion recognition in multimedia videos using multimodal fusion-based deep neural network, in accordance with an embodiment of the disclosure.

FIG. 2 is an exemplary block diagram of a system for emotion recognition in multimedia videos using multimodal fusion-based deep neural network, in accordance with an embodiment of the disclosure. FIG. 2 is explained in conjunction with elements from FIG. 1. With reference to FIG. 2, there is shown a block diagram 200 of the system 102 of FIG. 1. The system includes the circuitry 104, the memory 106, the multimodal fusion network 108, an input/output (I/O) device 202, a network interface 204, an inference accelerator 206, a translator model 208, a face detection model 210, a scene detection model 212, and a single boundary detection model 214.

The I/O device 202 may include suitable logic, circuitry, and/or interfaces that may be configured to receive one or more user inputs and/or render information (such as the predicted emotion label 126) produced by the system 102. The I/O device 202 may include various input and output devices, which may be configured to communicate with different operational components of the system 102. Examples of the I/O device 202 may include, but are not limited to, a touch screen, a keyboard, a mouse, a joystick, a microphone, and a display device (such as the display device 118).

The network interface 204 may include suitable logic, circuitry, interfaces, and/or code that may be configured to establish communication between the system 102, the display device 118, and the server 120 via the communication network 122. The network interface 204 may be configured to implement known technologies to support wired or wireless communication. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 204 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, 5G New Radio, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The inference accelerator 206 may include suitable logic, circuitry, interfaces, and/or code that may be configured to operate as a co-processor for the circuitry 104 to accelerate computations associated with the operations of the multimodal fusion network 108. For instance, the inference accelerator 206 may accelerate the computations on the system 102 such that the emotion label 126 is predicted in less time than what is typically incurred without the use of the inference accelerator 206. The inference accelerator 206 may implement various acceleration techniques, such as parallelization of some or all the operations of the one or more feature extractors 110, the network of transformer encoders 112, the fusion attention network 114, and the output network 116. The inference accelerator 206 may be implemented as a software, a hardware, or a combination thereof. Example implementations of the inference accelerator 206 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

The translator model 208 may include suitable logic, circuitry, interfaces, and/or code that may be configured to translate a speech in a second language to a first language (or vice-versa). In an embodiment, the translator model 208 may be configured to translate a transcript of the speech in first language to a second language. Examples of the translator model 208 may include, but are not limited to, an artificial neural network (ANN), a deep neural network (DNN), a convolutional neural network (CNN), a recurrent neural network (RNN), a gated recurrent unit (GRU)-based RNN, CNN-recurrent neural network (CNN-RNN), a Long Short-Term Memory (LSTM) network based RNN, LSTM+ ANN and/or a combination of such networks.

The face detection model 210 may include suitable logic, circuitry, interfaces, and/or code that may be configured to detect one or more faces in an image (or a frame). The face detection model 210 may use one or more face detection techniques to detect one or more faces in the image. The detailed implementation of the one or more face detection techniques may be known to one skilled in the art, and therefore, a detailed description for the aforementioned one or more face detection techniques has been omitted from the disclosure for the sake of brevity. Examples of face detection model 210 may include, but are not limited to, a convolutional neural network (CNN), an R-CNN, a Fast R-CNN, a Faster R-CNN, a (You Only Look Once) YOLO network, and/or a combination of such networks.

The scene detection model 212 may include suitable logic, circuitry, interfaces, and/or code that may be configured to extract a plurality of scenes from one or more videos. In an embodiment, the plurality of scenes may be extracted based on background pixel information (e.g., changes in background pixel values). Examples of the scene detection model 212 may include, but are not limited to, a convolutional neural network (CNN), a recurrent neural network (RNN), an artificial neural network (ANN), and/or a combination of such networks.

The single boundary detection model 214 may include suitable logic, circuitry, interfaces, and/or code that may be configured to detect a plurality of utterances in a scene. In an embodiment, the single boundary detection model 214 may include a VGG-16 convolution neural net (CNN) followed by multiple convolution layers. VGG-16 may be used for feature extraction and the convolution layers may be used for detection of objects. Based on the detection of the objects, the single boundary detection model 214 may further extract the plurality of scenes of a video. In an embodiment, the single boundary detection model 214 may extract the plurality of scenes of the video based on background pixel information (e.g., changes in background pixel values).

Figure 3:
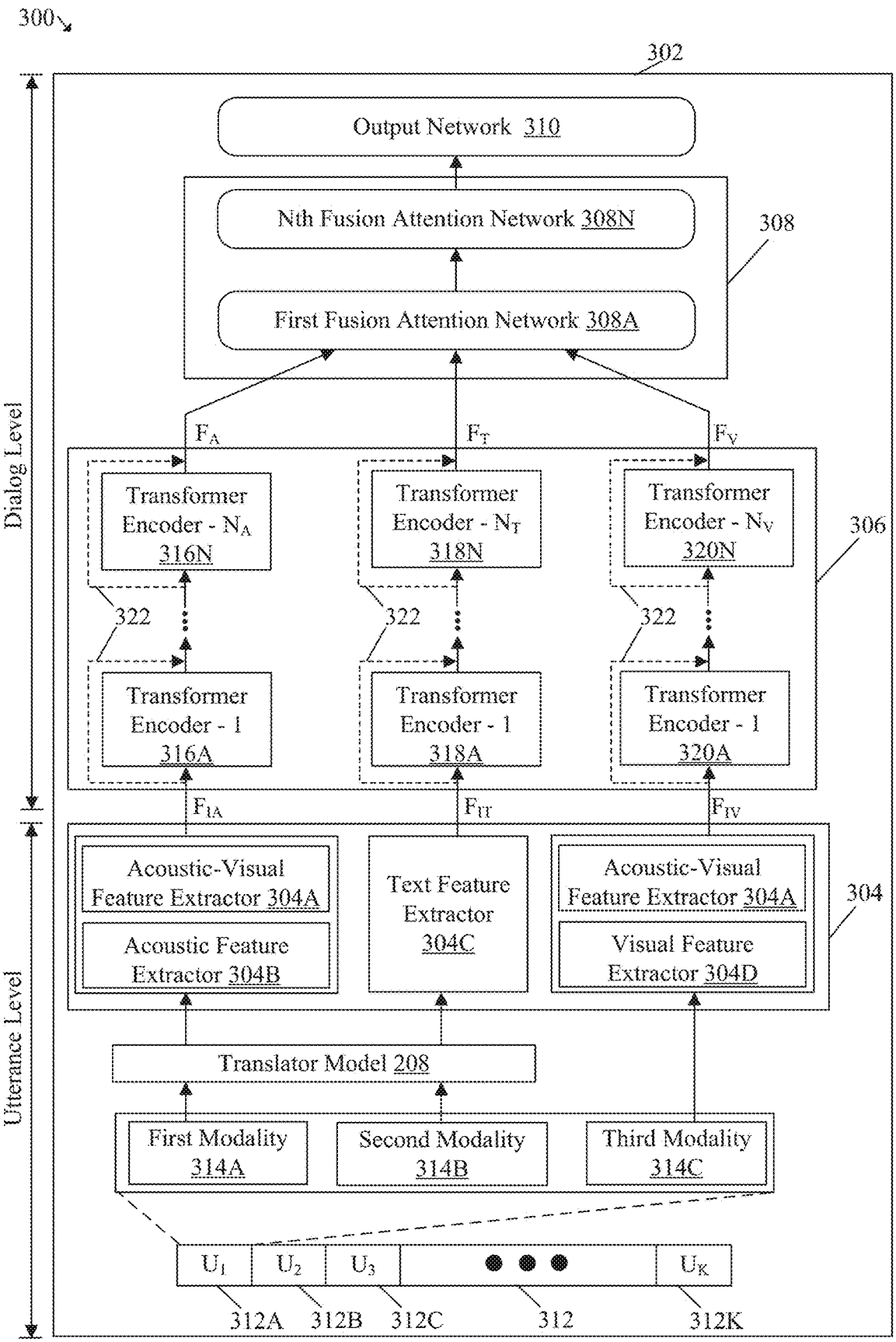
FIG. 3 is a diagram that illustrates an exemplary architecture of the multimodal fusion network of FIG. 1, in accordance with an embodiment of the disclosure.

FIG. 3 is a diagram that illustrates an exemplary architecture of the multimodal fusion network of FIG. 1, in accordance with an embodiment of the disclosure. FIG. 3 is explained in conjunction with elements from FIG. 1 and FIG. 2. With reference to FIG. 3, there is shown a diagram 300 of a multimodal fusion network 302, which may be an exemplary implementation of the multimodal fusion network 108 of FIG. 1.

The multimodal fusion network 302 may include one or more feature extractors 304, a network of transformer encoders 306, a set of fusion attention networks 308, and an output network 310. The network of transformer encoders 306 may be coupled to the one or more feature extractors 304, a first fusion attention network 308A of the set of fusion attention networks 308 may be coupled to the network of transformer encoders 306, and the output network 310 may be coupled to an Nth fusion attention network 308N of the set of fusion attention networks 308. In accordance with an embodiment, there may be single fusion attention network (e.g., the first fusion attention network 308A) that may be coupled to the network of transformer encoders 306 and the output network 310. With reference to FIG. 3, there is further shown a block-styled representation of a plurality of utterances 312 corresponding to conversations depicted in a video or in one or more videos.

At any time-instant, the circuitry 104 may receive one or more videos that may depict conversations (e.g., a dyadic conversation) between multiple human speakers or characters. For each utterance in such conversations, an emotion label needs to be predicted. Operations to predict the emotion label are described herein.

After the reception, the circuitry 104 may be configured to apply the scene detection model 212 on frames of the one or more videos. As discussed in FIG. 2, the scene detection model 212 may be trained to extract a plurality of scenes (or a plurality of dialogues) from each video. For automatic detection of utterances, the circuitry 104 may process frames of the video that correspond to the plurality of scenes. By way of example, and not limitation, the single boundary detection model 214 may be applied on the frames to detect multiple objects in each of such frames. Based on the detection, the circuitry 104 may further detect a subset of the frames which correspond to the plurality of utterances 312.

The circuitry 104 may extract audio portions from the one or more videos. Each of such audio portions may include a speech sound that corresponds to an utterance (as part of a conversation or a dialogue). Similarly, the circuitry 104 may generate text transcripts of such audio portions by use of a suitable Speech-To-Text (STT) technique.

The plurality of utterances 312 may include a first utterance 312A, a second utterance 312B, a third utterance 312C, and to a Kth utterance 312K. An utterance (such as the first utterance 312A) may be defined as a portion of a dialogue or a conversation that can be represented through a combination of a speech sound, an image (or images), and a text transcript of the speech sound. Each of the plurality of utterances 312 may have a corresponding first modality with acoustics of the corresponding utterance, a second modality of the plurality of modalities associated with a text transcript of the corresponding utterance, and a third modality associated with a visual aspect (e.g., a facial expression, a lip movement, and the like) of the corresponding utterance. For example, the first utterance 312A may include a first modality 314A associated with acoustics of the first utterance 312A, a second modality 314B associated with the text transcript of the first utterance 312A, and a third modality 314C associated with the visual aspect of the first utterance 312A. The first modality 314A, the second modality 314B, and the third modality 314C may together form a multimodal input (such as the multimodal input 124).

In an embodiment, a scene (or a dialog) may include "k" number of utterances "U" along with their respective emotion labels "Y" that may be arranged together with respect to time. Each utterance may be accompanied by the corresponding first modality (i.e., the speech segment), the second modality (i.e., the text transcript), and the third modality (i.e., the video clip). As an example, the scene for "k" number of utterances may be mathematically represented using an equation (1), which is given as follows:

$$\{U,Y\}=\{\{x_i=(x_a^i, x_t^i, x_v^i), y^i\} i\in[1,k]\} \quad (1)$$

where,
$x^i$ represents $i^{th}$ utterance,
$x_a^i$ represents the acoustics associated with the $i_{th}$ utterance;
$x_t^i$ represents the text transcript associated with the $i_{th}$ utterance,
$x_v^i$ represents the video associated with the $i_{th}$ utterance, and
$y^i$ represents an emotion label for the $i_{th}$ utterance.

The circuitry 104 may be configured to input the multimodal input to the one or more feature extractors 304. For example, the multimodal input may be associated with the first utterance 312A depicted in the received one or more videos.

In accordance with an embodiment, the multimodal input may include a multilingual speech and a text transcript of the multilingual speech in a first language that may be compatible with the one or more feature extractors 304. For example, the multilingual speech may correspond to an utterance "Hello Fred, Genkidesu ka?". In such a case, the text transcript of the multilingual speech may be "Hello Fred, how are you?".

In accordance with another embodiment, the multimodal input may include a speech in a second language that may be different from the first language compatible with the one or more feature extractors 304. In such a case, the multimodal input may include the text transcription of the speech in the first language (which is compatible with the one or more feature extractors 304). In such an embodiment, the circuitry 104 may be configured to apply the translator model 208 on the speech (in the second language) to translate the speech from the second language to the first language. The translation may be performed to overcome a language compatibility issue of the speech (in the second language) with the one or more feature extractors 304.

The one or more feature extractors 304 may include an acoustic feature extractor 304B, a text feature extractor 304C, a visual feature extractor 304D, and an acoustic-visual feature extractor 304C. In an embodiment, each of the one or more feature extractors 304 may include at least one neural network that may be configured to extract features associated with the corresponding modality. For example, the acoustic feature extractor 304B and the acoustic-visual feature extractor 304C may be configured to extract features associated with the acoustics of the first utterance 312A. Similarly, the text feature extractor 304C may be configured to extract features associated with the text transcript of the first utterance 312A and the visual feature extractor 304D, and the acoustic-visual feature extractor 304C may be configured to extract features associated with the visual aspects of the first utterance 312A. Such features may be collectively referred to as input embeddings.

In an embodiment, the circuitry 104 may be configured to generate the input embeddings based on the application of the one or more feature extractors 304 on the multimodal input. Specifically, the circuitry 104 may be configured to generate a first embedding ($F_{IA}$) based on application of the acoustic-visual feature extractor 304C on acoustic information of the utterance included in the multimodal input. The acoustic-visual feature extractor 304C may be based on a triplet network that may enable the acoustic-visual feature extractor 304C to leverage an importance of 3 loss functions. The acoustic-visual feature extractor 304C may include an encoder network and a projector module and may be trained on loss functions such as an adaptive margin triplet loss, a covariance loss, and a variance loss. Details about the acoustic-visual feature extractor 304C are provided, for example, in FIG. 6.

In an embodiment, the circuitry 104 may be configured to perform one or more operations on the acoustic information before the acoustic information is provided as an input to the acoustic-visual feature extractor 304C. The circuitry 104 may be configured to transform an audio portion included in the acoustic information into two-dimensional (2D) Mel Spectrogram in RGB format. Such 2D Mel Spectrogram in RGB format may be provided as an input to the acoustic-visual feature extractor 304C. To transform the audio portion into two-dimensional (2D) Mel Spectrogram, the circuitry 102 may be configured to process an audio signal of the audio portion via one or more augmentation techniques such as time warping and Additive White Gaussian Noise (AWGN) to generate augmented audio signals. Such generated augmented signals may be further transformed into the Mel Spectrogram. In an embodiment, the Mel Spectrogram may be computed by using the Short Time Fourier transform (STFT) with a frame length of 400 samples (25 ms) and a hop length of 160 samples (10 ms), and 128 Mel filter banks. The circuitry may be further configured to generate a first embedding ($F_{IA}$) based on application of the Mel Spectrogram.

In another embodiment, the circuitry 104 may be configured to generate a first embedding ($F_{IA}$) based on application of the acoustic feature extractor 304B on acoustic information of the utterance included in the multimodal input. The acoustic feature extractor 304B may be based on, for example, openSMILE (open-source Speech and Music Interpretation by Large-space Extraction) model. In an embodiment, the acoustic feature extractor 304B may further include a multi-layer perceptron (MLP) network that may be trained on utterance labels. The circuitry 104 may be configured to generate the embedding ($F_{IA}$) of the input embeddings based on application of the multi-layer perceptron (MLP) network on an output produced by the acoustic feature extractor 304B using openSMILE. For example, the first embedding may be mathematically represented using equation (2), which is given as follows:

$$F_{IA}^i = \emptyset_{AFE}(x_a^i) i\in[1,k], \forall F_{IA} \in R^{k*D_A} \quad (2)$$

where,
$F_{IA}^i$ represents the first embedding,
$\emptyset_{AGFE}$ represents the operation of the acoustic-video feature extractor 304C or acoustic feature extractor 304B,
k represents a count of the plurality of utterances, $x_a{}^i$ represents the acoustics (or the audio component) of the ith utterance, and $D_A$ represents a size of embeddings of the audio utterance.

In an embodiment, the circuitry 104 may be configured to generate a second embedding of the input embeddings based on application of the text feature extractor 304C on a text transcript of acoustic information associated with the first utterance 312A. The second embedding may be generated further based on application of the text feature extractor 304C on text transcripts of different utterances that precede or succeed the first utterance 302A in time. The text transcripts of different utterances that precede or succeed the first utterance 302A in time may be separated by a separator token (<s>). For example, if a fourth utterance of a scene is "The whole thing! Can we go?", the fifth utterance of the scene is "What about the scene with the Kangaroo", and the sixth utterance of the scene is "I was surprised to see a Kangaroo in a world war epic", then the text transcript of the fifth utterance may be "The whole thing! Can we go?<s> What about the scene with the Kangaroo <s> I was surprised to see a Kangaroo in a world war epic".

In an embodiment, the text feature extractor 304C may be implemented based on a RoBERTa model (Robustly optimized BERT (Bidirectional Encoder Representations from Transformers) approach). For example, the second embedding may be mathematically represented using equation (3), which is given as follows:

$$F_{IT}{}^i = \emptyset_{TFE}(x_t{}^i) i \in [1,k], \forall F_{IT} \in R^{k*D_T} \quad (3)$$

where, $F_{IA}{}^i$ represents the second embedding of input embeddings, $\emptyset_{TFE}$ represents the operation of the text feature extractor 304C (which may be the RoBERTa model or a modified RoBERTa model);

k represents a count of the plurality of utterances, $x_t{}^i$ represents the text transcript of the $i_{th}$ utterance, and $D_T$ represents a size of embeddings of the text utterance.

In an embodiment, the circuitry 104 may be configured to generate a third embedding of the input embeddings based on application of one of the acoustic-visual feature extractor 304C or visual feature extractor 304D on facial information of one or more speaking characters in frames of the one or more videos and on scene information associated with the frames. The frames may correspond to a duration of the first utterance 312A in the one or more videos. Each of the acoustic-visual feature extractor 304C and the visual feature extractor 304D may be a dual network that may be configured to detect one or more faces of the one or more speaking characters and an area of each of the one or more faces, for example. In an embodiment, the acoustic-visual feature extractor 304C or the visual feature extractor 304D may include a first network to extract features from detected one or more features of the one or more speaking characters and a second network to extract features from a whole scene that includes the one or more speaking characters. A visual feature network may normalize the detected one or more faces based on the corresponding area to generate the third embedding of the input embeddings. Details about the acoustic-visual feature extractor 304C and the visual feature extractor 304D are provided for example, in FIG. 4. The generated third embedding may be mathematically represented using equation (4), which is given as follows:

$$F_{IV}{}^i = \emptyset_{VFE}(x_v{}^i) i \in [1,k], \forall F_{IV} \in R^{k*D_V} \quad (4)$$

where, $F_{IA}{}^i$ represents the third embedding of input embeddings, $\emptyset_{VFE}$ represents the operation of the acoustic-visual feature extractor 304C or the visual feature extractor 304D;

k represents a count of the plurality of utterances, $x_v{}^i$ represents the video associated with the $i_{th}$ utterance, and $D_V$ represents a size of embeddings of the visual utterance.

The generated input embeddings (which include an embedding for each modality of the multimodal input) may be fed to the network of transformer encoders 306 as an input. The input embedding may be passed through the network of transformer encoders 306 to learn an inter utterance context with respect to each modality of the multimodal input. The network of transformer encoders 306 may include a first stack 316 of transformer encoders for the first modality 314A of the multimodal input, a second stack 318 of transformer encoders for a second modality 314B of the multimodal input, and a third stack 320 of transformer encoders for a third modality 314C of the multimodal input. In an embodiment, the first stack 316 of transformer encoders, the second stack 318 of transformer encoders, and the third stack 320 of transformer encoders may include same number of transformer encoders. In another embodiment, the first stack 316 of transformer encoders, the second stack 318 of transformer encoders, and the third stack 320 of transformer encoders may include different number of transformer encoders.

The first stack 316 of transformer encoders may include a first transformer encoder 316A . . . and up to a Nth transformer encoder 316N. The output of the first transformer encoder 316A may be provided as an input to the Nth transformer encoder 316N. Similarly, the second stack 318 of transformer encoders may include a first transformer encoder 318A . . . and up to a Nth transformer encoder 318N. The output of the first transformer encoder 318A may be provided as an input to the Nth transformer encoder 318N. Similarly, the third stack 320 of transformer encoders may include a first transformer encoder 320A . . . and up to a Nth transformer encoder 320N. The output of the first transformer encoder 320A may be provided as the input to the Nth transformer encoder 320N.

The first embedding ($F_{IA}$) of the input embeddings may be provided as an input to the first transformer encoder 316A of the first stack 316 of transformer encoders. The second embedding ($F_{IT}$) of input embeddings may be provided as an input to the first transformer encoder 318A of the second stack 318 of transformer encoders. Similarly, the third embedding ($F_{IV}$) of input embeddings may be provided as an input to the first transformer encoder 318A of the third stack 320 of transformer encoders.

Each transformer encoder of the network of transformer encoders 306 may be trained to generate a set of emotion-relevant features. The set of emotion-relevant features may include one or more features corresponding to each modality of the multimodal input. For example, the one or more features corresponding to the first modality 314A may be mathematically represented using equation (5), which is given as follows:

$$F_A^i = T_{\circ_{N_A}}\left(\ldots\left(T_{\circ_{N_2}}\left(T_{\circ_{N_1}}\left(F_{IA}^i\right)\right)\right)\right) \quad (5)$$

where, $F_{IA}{}^i$ represents the first embedding of the input embeddings;

$T_\delta$ represents the operation of the transformer encoder, $N_1$ represents the first transformer encoder 316A of the first stack 316 of transformer encoders;
$N_A$ represents the Nth transformer encoder 316N of the first stack 316 of transformer encoders; and
$i \in [1,k]$.

The one or more features corresponding to the second modality 314B may be mathematically represented using equation (6), which is given as follows:

$$F_T^i = T_{o_{N_T}}\left(\ldots\left(T_{o_{N_2}}\left(T_{o_{N_1}}\left(F_{IT}^i\right)\right)\right)\right) \tag{6}$$

where, $F_{IT}^i$ represents the second embedding of the input embeddings;
$T_\delta$ represents the operation of the transformer encoder,
$N_1$ represents the first transformer encoder 318A of the second stack 318 of transformer encoders;
$N_T$ represents the Nth transformer encoder 318N of the second stack 318 of transformer encoders; and
$i \in [1,k]$.

Similarly, the one or more features corresponding to the third modality 314C may be mathematically represented using equation (7), which is given as follows:

$$F_V^i = T_{o_{N_V}}\left(\ldots\left(T_{o_{N_2}}\left(T_{o_{N_1}}\left(F_{IV}^i\right)\right)\right)\right) \tag{7}$$

where, $F_{IV}$ represents the third embedding of the input embeddings;
$T_\delta$ represents the operation of the transformer encoder,
$N_1$ represents the first transformer encoder 320A of the third stack 320 of transformer encoders;
$N_V$ represents the Nth transformer encoder 318N of the third stack 320 of transformer encoders; and
$i \in [1,k]$.

In an embodiment, the multimodal fusion network 302 may further include a skip connection 322 between each pair of adjacent transformer encoders in the network of transformer encoders 306. Specifically, the skip connection 322 may be present between each pair of adjacent transformer encoders in the first stack 316 of transformer encoders, the second stack 318 of transformer encoders, and the third stack 320 of transformer encoders. The skip connection 322 may be employed in the multimodal fusion network 302 to prevent the multimodal fusion network 302 from ignoring lower-level features associated with each modality of the multimodal input.

The generated set of emotion-relevant features may be provided as the input to the fusion attention network 308 of the set of fusion attention networks 308. The set of fusion attention networks 308 may be coupled to the network of transformer encoders 306 and may include at least one fusion attention network. As an example, the set of fusion attention networks 308 may include, but not limited to, a first fusion attention network 308A . . . and up to an Nth fusion attention network 308N. Each fusion attention network of the set of fusion attention networks 308 may include one or more multi-head attention layers and a first fully connected layer. In an embodiment, the input of the first fully connected layer may be coupled to an output of the one or more multi-head attention layers of the corresponding fusion attention network. Each of the set of fusion attention networks 308 may be configured to output a fused-feature representation of the set of emotion-relevant features.

Figure 5:
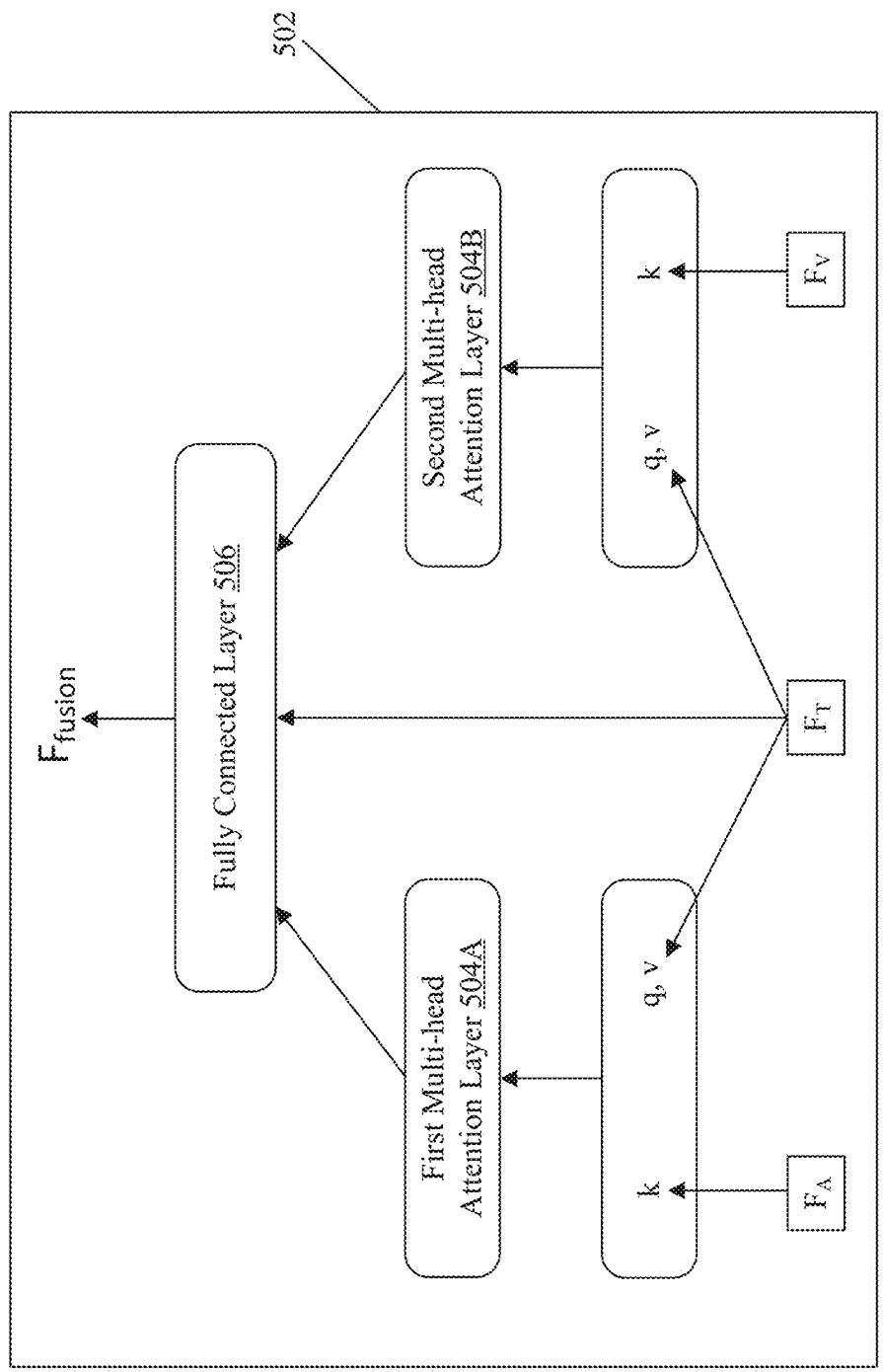
FIG. 5 is a diagram that illustrates an exemplary architecture of a fusion attention network of the set of fusion attention networks of FIG. 3, in accordance with an embodiment of the disclosure.

Details about each of the set of fusion attention networks 308 and the set of emotion-relevant features are provided, for example, in FIG. 5. By way of example, and not limitation, the fused-feature representation of the set of emotion-relevant features may be mathematically represented using equations (8) and (9), which is given as follows:

$$F_{fusion_1}^i = \mathrm{MHA}_1(F_A^i, F_T^i, F_V^i), \tag{8}$$

$$F_{fusion_m}^i = \mathrm{MHA}_m(\ldots(\mathrm{MHA}_2(F_{fusion_1}^i))) \tag{9}$$

where, $F_{fusion_1}^i$ represents the output of the first fusion attention network 308A;
MHA represents the operation of a multi-head attention layers of the one or more multi-head attention layers,
$F_{fusion_m}^i$ represents the output of the Nth fusion attention network 308N (or the output of the set of fusion attention networks 308);
$F_A^i$ represents the one or more features corresponding to the first modality 314A;
$F_T^i$ represents the one or more features corresponding to the second modality 314B;
$F_V^i$ represents the one or more features corresponding to the third modality 314C;
m represents a count of the one or more multi head attention layers in the set of fusion attention networks 308; and
$i \in [1,k]$.

In an embodiment, the generated fused-feature representation may be provided as the input to the output network 310. The output network 310 may include a second fully connected layer that may be coupled to the output of the set of fusion attention networks 308. The second fully connected layer of the output network 310 may be configured to predict an emotion label for the first utterance 312A of the plurality of utterances 312. In an embodiment, the second fully connected layer may include a SoftMax function or cross entropy function implemented at the output of the second fully connected layer. The predicted emotion label may be one of, but is not limited to, a happy emotion label, a sad emotion label, an angry emotion label, a calm emotion label, a fear emotion label, a neutral emotion label, an excited emotion label, a confused emotion label, a stressed emotion label, a disgusted emotion label, a surprised emotion label, an excitement emotion label, or a scared emotion label.

In an embodiment, the output network 310 may be configured to predict a sentiment label for the multimodal input. The predicted sentiment label may indicate whether an utterance (for which the multimodal input is provided as the input to the multimodal fusion network 302) corresponds one of a positive sentiment, a negative sentiment, or a neutral sentiment.

In an embodiment, the output of the output network 310 may be mathematically represented using equations (10) and (11), which is given as follows:

$$Y_p^i = \langle y_1^i, y_2^i, \ldots, y_p^i \rangle \tag{10}$$

$$y_p^i = \mathrm{FC}(F_{fusion_m}^i) \tag{11}$$

where, $Y_p^i$ represents the predicted emotion label for each of the plurality of utterances 312;
$y_1^i$ represents the predicted emotion label for the first utterance 312A of the plurality of utterances 312,
$y_p^i$ represents the predicted emotion label for the $p^{th}$ utterance of the plurality of utterances 312

FC represents the operation of second fully connected layer of the output network 310,
$F_{fusion_m}^i$ represents the output of the Nth fusion attention network 308N (or the output of the set of fusion attention networks 308); and
i∈[1,k].

In an embodiment, operations of the multimodal fusion network 302 may be divided into two levels, i.e., an utterance level and a dialogue level. The one or more feature extractors 304 may be considered as part of the utterance level because the embeddings associated with each modality of the multimodal input may be generated independently. At the dialog level, the multimodal fusion network 302 may learn to predict the emotion for each utterance by using contextual information from the dialog as a whole.

Figure 4:
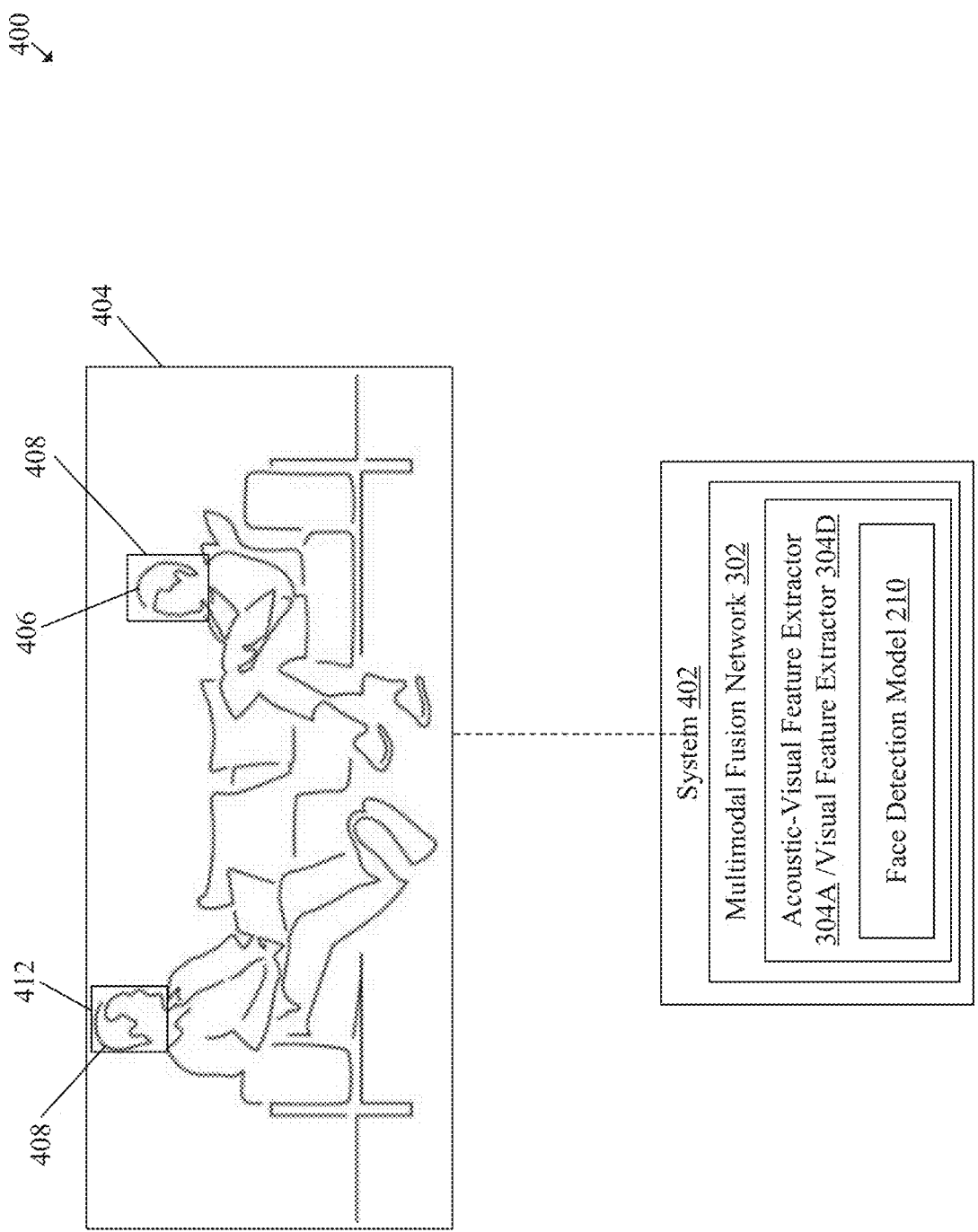
FIG. 4 is a diagram that illustrates an exemplary visual feature extractor of the multimodal fusion attention network of FIG. 3, in accordance with an embodiment of the disclosure.

In an embodiment, the plurality of modalities may also include a fourth modality associated with one or more biological parameters of a subject associated with the corresponding utterance. For example, the one or more biological parameters may be captured during the recording of the utterance and may be converted into timeseries data (or a multi-dimensional spatial data) for further processing by the multimodal fusion network 302. The circuitry 104 may be configured to predict the emotion label of the subject based on all four modalities, i.e., the first modality, the second modality, the third modality and the fourth modality. A pseudocode for the operations performed by the system 102 are provided, as follows:

| Input | $F_T$: Text Feature Outcome, |
| | $F_A$: Audio Feature Outcome, |
| | $F_V$: Visual Feat Outcome |
| Output | $F_{Fusion}$: Fused Feature Outcome |
| Procedure | $F_{fusion}(F_V, F_A, F_T)$ |
| | $F_{AT} = MHA(F_T, F_A, F_T)$ |
| | $F_{VT} = MHA(F_T, F_V, F_T)$ |
| | $F_{combined} = Concat(F_T, F_{AT}, F_{VT})$ |
| | $F_{Fusion} = FC(F_{combined}, size = D_T)$ |
| | return $F_{Fusion}$ |
| | end procedure | where,
MHA corresponds to the Multi-Head Attention network operation (i.e. the fusion attention network operation)
Concat corresponds to the Concatenation operation
FC corresponds to the Second Fully Connected layer operation
$D_T$ corresponds to the Dimensions of Text FIG. 4 is a diagram that illustrates an exemplary visual feature extractor of the multimodal fusion attention network of FIG. 3, in accordance with an embodiment of the disclosure. FIG. 4 is explained in conjunction with elements from FIG. 1, FIG. 2, and FIG. 3. With reference to FIG. 4, there is a diagram 400 that may include a system 402. The system 402 may be an exemplary implementation of the system 102 of FIG. 1. The system 402 includes the multimodal fusion network 302. The multimodal fusion network 302 may include the one or more feature extractors 304. With reference to FIG. 4, there is further shown a frame 404 of a plurality of frames corresponding to a duration of the first utterance 312A of the plurality of utterances 312.

The system 402 may input the plurality of frames of one or more videos to the visual feature extractor 304D. The visual feature extractor 304D may include the face detection model 210. In an embodiment, the face detection model 210 may correspond to a Multi-task Cascaded Convolutional Network (MTCNN). The face detection model 210 may be applied on the frame 414 to detect one or more faces in each of the received plurality of frames. As an example, for the frame 404, the detected one or more faces may include a first face 406 and a second face 408.

The system 402 may be configured to generate one or more bounding boxes that may include the detected one or more faces. The generated one or more bounding boxes may include a first bounding box 410 and a second bounding box 412. The first bounding box 410 may include the first face 406 and the second bounding box 412 may include the second face 408. In an embodiment, the one or more bounding boxes may be generated based on application of the face detection model 210 on the frame 404. Thereafter, the system 402 may normalize an area associated with each of the one or more bounding boxes based on the application of one of the acoustic-visual feature extractor 304C or the visual feature extractor 304D. Based on the normalization, the system 402 may generate the third embedding of the input embeddings as the output of the acoustic-visual feature extractor 304C or the visual feature extractor 304D.

The system 402 may be configured to determine a weighted sum based on features associated with each of the detected one or more faces and the corresponding normalized areas. The weighted sum may be mathematically represented using equation (12), which is given as follows:

$$F_{IV} = F_1 W_1 + F_2 W_2 \tag{12}$$

where,
$F_{IV}$ represents the third embedding of the input embeddings;
$F_1$ represents the features associated with the detected first face 406,
$F_2$ represents the features associated with the detected second face 408,
$W_1$ represents the normalized area of the first bounding box 410; and
$W_2$ represents the normalized area of the second bounding box 412.

In an embodiment, the visual feature extractor 304D may include a visual transformer (ViT) that may be used on a first count (e.g., 15 in case of the acoustic-visual feature extractor 304C and 30 in case of the visual feature extractor 304D) of successive frames for the duration of the first utterance 312A. The system 102 may extract features from each frame that is included in the first count, based on aforementioned operations. The extracted features from each of the first count of successive frames may be max pooled to generate the third embedding (which is represented using equation (7) and equation (12)).

In another embodiment, the acoustic-visual feature extractor 304C or the visual feature extractor 304D may be a dual network. The dual network may include a first network for detection of the one or more faces in the frame 404 and a second network for focusing on the frame 404 as a whole. Specifically, the second network may focus on one or more objects and other visual cues (i.e. scene information) that may be visible in the frame 404. The circuitry 104 may be further configured to generate the third embedding of the input embeddings as the output of the acoustic-visual feature extractor 304C or the visual feature extractor 304D, based on application of the first network and the second network on the frame(s).

FIG. 5 is a diagram that illustrates an exemplary architecture of a fusion attention network of FIG. 3, in accordance with an embodiment of the disclosure. FIG. 5 is explained in conjunction with elements from FIG. 1, FIG. 2, FIG. 3, and FIG. 4. With reference to FIG. 5, there is shown a diagram 500 of a first attention network 502 which may be an exemplary embodiment of the first fusion attention network 308A of the set of fusion attention networks 308.

The first attention network 502 may include one or more multi-head attention layers that may further include a first multi-head attention layer 504A and a second multi-head attention layer 504B. The first attention network 502 may further include a fully connected layer 506 (also referred as a first fully connected layer). The architecture of each fusion attention network in the set of fusion attention networks 308 may be same as shown in the diagram 500. The set of fusion attention networks 308 may be coupled to network of transformer encoders 306 and the output network 310. Specifically, the output of the network of transformer encoders 306 (i.e., the set of emotion-relevant features) may be provided as an input to the set of fusion attention networks 308 (specifically to the first fusion attention network 308A) and the output of the set of fusion attention networks 308 may be provided as an input to the output network 310.

The circuitry 104 may be configured to provide the set of emotion-relevant features as input to the first attention network 502 of the set of fusion attention networks 308. As discussed above, the set of emotion-relevant features may include one or more features (represented by equation (5)) associated with the first modality, one or more features (represented by equation (6)) associated with the second modality, and one or more features (represented by equation (7)) associated with the third modality. Specifically, the circuitry 104 may be configured to provide the set of emotion-relevant features to the one or more multi-head attention layers of the first attention network 502.

Each of the one or more multi-head attention layers may accept a query, a key, and a value as input and may be configured to capture dependencies of various ranges (e.g., shorter-range, and longer-range) within a sequence. In an embodiment, the one or more features ($F_A$) associated with the first modality may be provided as "Key (k)", and the one or more features ($F_T$) associated with the second modality may be provided as "Query (q) and Values (v)" to the first multi-head attention layer 504A. Similarly, the one or more features ($F_V$) associated with the third modality may be provided as "Key (k)", and the one or more features ($F_T$) associated with the third modality may be provided as "Query (q) and Values (v)" to the second multi-head attention layer 504B.

The circuitry 104 may be configured to apply the one or more multi-head attention layers on the set of emotion-relevant features to determine an inter-feature mapping within the set of emotion-relevant features. As discussed, each of the one or more multi-head attention layers may capture dependencies between feature(s) associated with the first modality, feature(s) associated with the second modality, and feature(s) associated with the third modality. With the mapping, each respective modality of the plurality of modalities may be mapped to a text vector space. The circuitry 104 may be configured to concatenate the set of emotion-relevant features into a latent representation of the set of emotion-relevant features, based on the inter-feature mapping. After the concatenation, the concatenated output (i.e., the latent representation of the set of emotion-relevant features) may be provided as an input to the fully connected layer 506. Based on the application of the fully connected layer 506, the circuitry 104 may be configured to generate the fused-feature representation of the set of emotion-relevant features. The fused-feature representation of the set of emotion-relevant features may be a vector that may belong to $R^{k*D_T}$ and may be represented by using equations (8) and (9). Specifically, the vector may belong to a real coordinate space of dimension $K*D_T$.

In accordance with an embodiment, the circuitry 104 may be further configured to provide the fused-feature representation of the set of emotion-relevant features as input to the second fully connected layer of the output network 310 and may be coupled to the output of the set of fusion attention networks 308. Based on the application of the second fully connected layer of the output network 310, the circuitry 104 may be further configured to predict the emotion label for the corresponding utterance. In an embodiment, the output of the first fusion attention network 308A may be passed to a second fusion attention network. This same process may be repeated n number of times and the output of the Nth fusion attention network 308N may be passed as an input to a second fully connected layer (i.e., the output network 310) that may be configured to predict the emotion label for the corresponding utterance.

Figure 6:
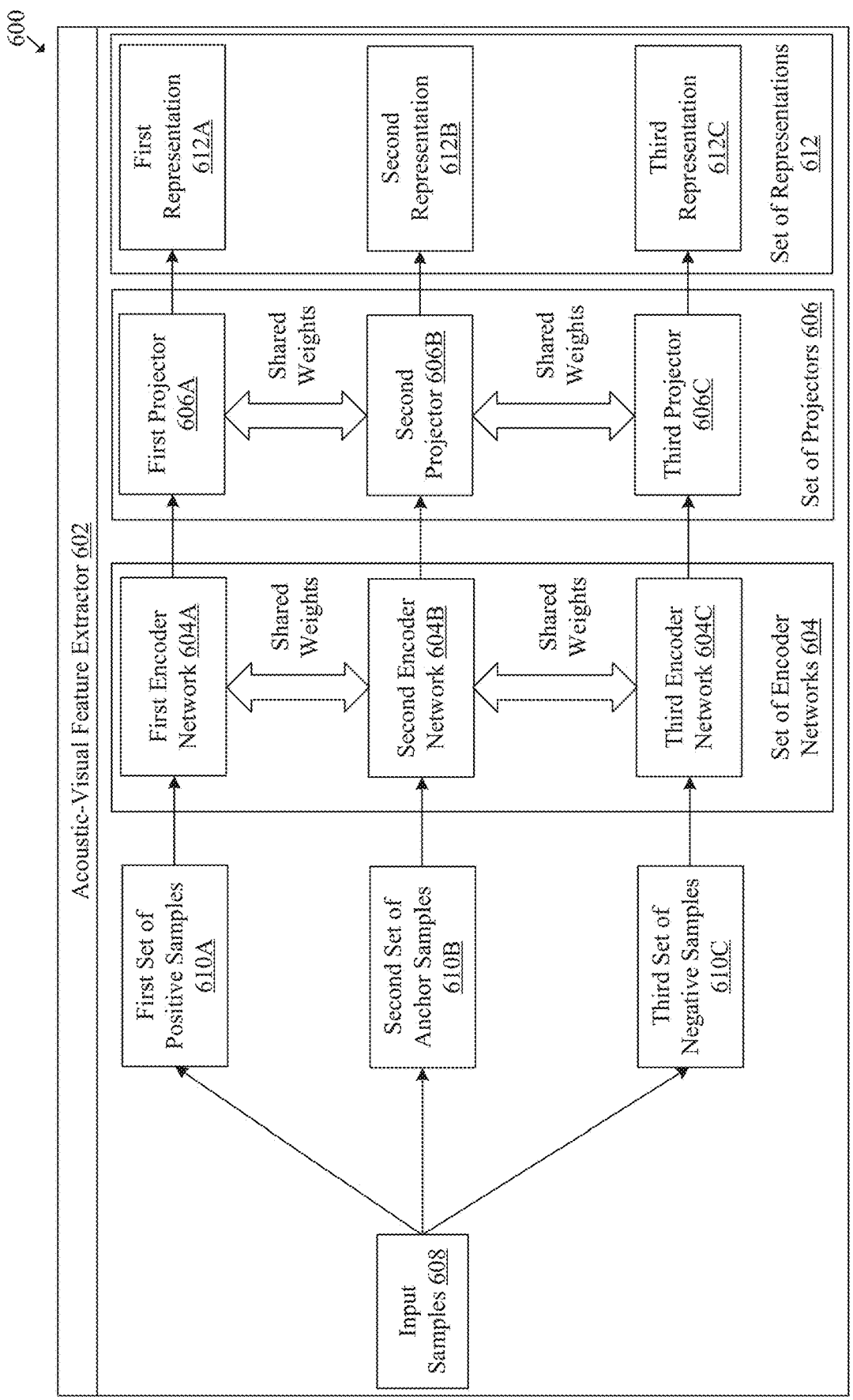
FIG. 6 is a diagram that illustrates an exemplary architecture of an acoustic-visual feature extractor of the one or more feature extractors, in accordance with an embodiment of the disclosure.

FIG. 6 is a diagram that illustrates an exemplary architecture of an acoustic-visual feature extractor of the one or more feature extractors 304 of FIG. 3, in accordance with an embodiment of the disclosure. FIG. 6 is explained in conjunction with elements from FIG. 1, FIG. 2, FIG. 3, FIG. 4, and FIG. 5. With reference to FIG. 6, there is shown a diagram 600 of an acoustic-visual feature extractor 602 of the one or more feature extractors 304.

The acoustic-visual feature extractor 602 may be based on a triplet network. In the triplet network, three input samples may be required. There is further shown a set of encoder networks 604 that may include a first encoder network 604A, a second encoder network 604B, and a third encoder network 604C. The acoustic-visual feature extractor 602 may further include a set of projectors 606. The set of projectors 606 may include a first projector 606A, a second projector 606B, and a third projector 606C.

In an embodiment, input samples 608 associated with the acoustic and visual modalities may be divided into a set of positive samples 610A, a set of anchor samples 610B, and a set of negative samples 610C. Each of the set of positive samples 610A may be similar to the set of anchor samples 610B and each of the set of positive samples 610A may be different from the set of anchor samples 610B. The set of positive samples 610A may be fed to through the first encoder network 604A. The set of anchor samples 610B may be fed to the second encoder network 604B. Similarly, the set of negative samples 610C may be fed to the third encoder network 604C. Each encoder of the set of encoders 604 may have same architecture with same number of neurons and associated weights. An example of an encoder may be a ResNet-18 network.

In an embodiment, the first encoder network 604A may generate a first output. The second encoder network 604B may generate a second output. Similarly, the third encoder network 604C may generate a third output. The first output may be provided as an input to the first projector 606A, the second output may be provided as the input to the second projector 606B, and the third output may be provided as the input to the third projector 606C. Each projector of the set of projectors 606 may include a fully linear-fully connected layer which may be configured to project the embedding of set of encoder networks 604 to a set of representations 612. Specifically, the set of representations 612 may include a first representation 612A of the set of positive samples 610A, a second representation 612B of the set of anchor samples 610B, and a third representation 612C of the set of negative samples 610C. The set of representations 612 may be mathematically represented using equation (13), which is given as follows:

$$Z = [z_1, z_2, \ldots z_N] \in R^{N \times d} \quad (13)$$

where,
Z represents the desired representations,
N represents a count of representations, and
d represents dimension of each representation.

The acoustic-visual feature extractor 602 may be trained using weighted combination of three loss functions i.e., an adaptive margin triplet loss function, a covariance loss function, and a variance loss function. The objective of the training of the acoustic-visual feature extractor 602 may be to reduce a distance between the set of positive samples 610A and the set of anchor samples 610B and increase a second distance between the set of anchor samples 610B, and the set of negative samples 610C. The weighted combination of three loss functions may be mathematically represented using equation (14), which is given as follows:

$$L_{FE} = \lambda_1 \cdot L_{AMT} + \lambda_2 \cdot L_{Cov} + \lambda_3 \cdot L_{Var} \quad (14)$$

where,
$\lambda_1$, $\lambda_2$, and $\lambda_3$ represents a weighing factor,
$L_{AMT}$ represents the adaptive margin triplet loss function,
$L_{Cov}$ represents the covariance loss function,
$L_{Car}$ represents the variance loss function, and
$L_{FE}$ represents a triplet loss function.

Traditionally, developers designed triplet loss function used to learn good representations of faces based on the set of positive samples 610A, the set of anchor samples 610B, and the set of negative samples 610C. Developers tend to use a fixed margin value in their triplet loss function that helps to separate out the representations of positive and negative samples. However, in cases where the positive or negative samples have the same distance with the anchor or the positive sample is only a bit closer to the anchor than the negative sample, triplet loss calculated for such fixed value margin may be zero, and there may be no correction even though it should still be pulling the positive sample closer and pushing the negative sample away from the anchor. To overcome this issue, an adaptive margin value loss function may be used in the calculation of the triplet loss function. This adaptive margin value loss function may be mathematically represented using equation (15), which is given as follows:

$$L_{AMT} = D_s^{a,p} - \frac{D_s^{a,n} + D_s^{p,n}}{2} + m_{AM} \quad (15)$$

where,
$D_s^{a,p}$ represents a Euclidean distance based a similarity metric between representations of the set of positive samples 610A, and the set of anchor samples 610B,
$D_s^{a,n}$ represents a Euclidean distance based a similarity metric between representations of the set of anchor samples 610B, and the set of negative samples 610C,
$D_s^{p,n}$ represents a Euclidean distance based a similarity metric between representations of the set of positive samples 610A, and the set of negative samples 610C, and
$m_{AM}$ represents an adaptive margin.

In an embodiment, the adaptive margin ($m_{AM}$) may be calculated based on similarity and dissimilarity measures and may be mathematically represented using equation (16), which is given as follows:

$$m_{AM} = m_{AM}^{sim} + m_{AM}^{dissim} \quad (16)$$

where,
$m_{AM}^{sim}$ represents a similarity measure and $$m_{AM}^{sim} = 1 + \frac{2}{e^{4 \cdot D_s^{a,p}}},$$

$m_{AM}^{dissim}$ represents a similarity measure and $$m_{AM}^{dissim} = 1 + \frac{2}{e^{-4 \cdot D_s^{a,n} + 4}}.$$

In an embodiment, the triple loss function may also include a variance loss function. The variance loss function may assist the acoustic-visual feature extractor 602 to tackle the mode collapse issue(s) and may mathematically be represented using equation (17), which is given as follows:

$$L_{Var} = \sum_{k=1}^{3} L_{Var}(Z_k) \quad (17)$$

$$L_{Var}(Z_k) = \frac{1}{d} \sum_{j=1}^{d} 1 - \sqrt{\text{Var}(Z_{:,j}) + \epsilon}$$

where,
Var(Z) represents variance obtained from corresponding representations, and
$\text{Var}(Z) = 1/N - 1 \sum_{i-1}^{N} (Z^i - \hat{Z})^2$,
$Z_k = Z_A, Z_p, Z_n$,
$Z_p$ represents a first representation corresponding to the set of positive samples 610A,
$Z_a$ represents a second representation corresponding to the set of anchor samples 610B,
$Z_n$ represents a third representation corresponding to the set of negative samples 610C, and
$\hat{Z}$ represents a mean of the corresponding representation.

In an embodiment, the triple loss function may also include a covariance loss function. The covariance loss function may assist the acoustic-visual feature extractor 602 to decorrelate the different dimensions of the representations and may mathematically be represented using equation (18), which is given as follows:

$$L_{Cov} = \sum_{k=1}^{3} L_{Cov}(Z_k) \quad (18)$$

$$L_{Cov}(Z_k) = \frac{1}{d} \sum_{i \neq j} \text{Cov}(Z_k)_{i,j}^T$$

where,
Cov(Z) represents a covariance matrix of corresponding representations, and $$\text{Cov}(Z) = \frac{1}{N-1} \sum_{i-1}^{N} (Z^i - \hat{z})(Z^i - \hat{z})^T, Z_k = Z_A, Z_p, Z_n,$$

$Z_p$ represents a first representation corresponding to the set of positive samples 610A, $Z_a$ represents a second representation corresponding to the set of anchor samples 610B, $Z_n$ represents a third representation corresponding to the set of negative samples 610C, and $\hat{Z}$ represents a mean of the corresponding representation.

Figure 7:
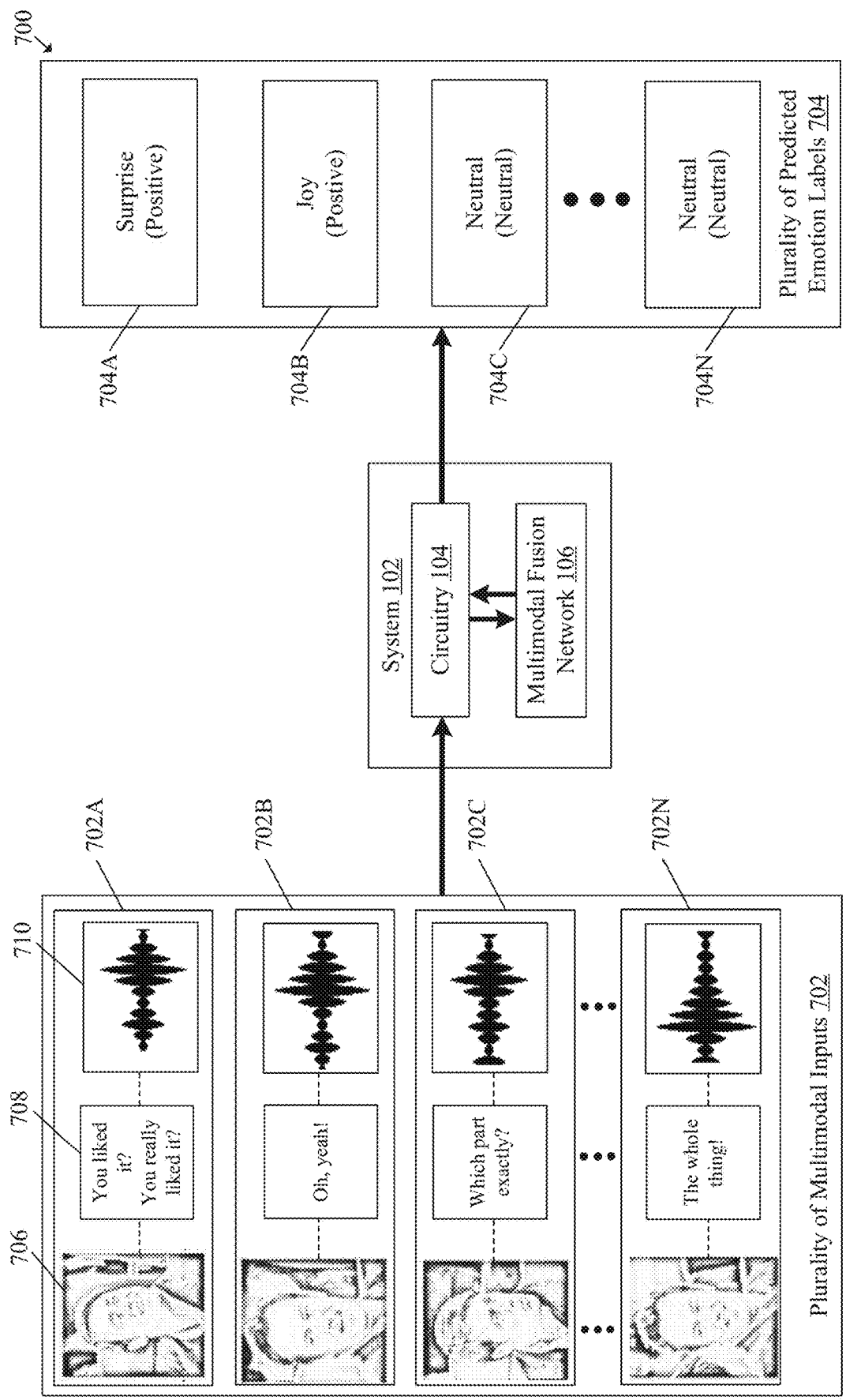
FIG. 7 is a diagram that illustrates an exemplary scenario for emotion recognition in multimedia videos using multimodal fusion-based deep neural network, in accordance with an embodiment of the disclosure.

FIG. 7 is a diagram that illustrates an exemplary scenario for emotion recognition in multimedia videos using a multimodal fusion-based deep neural network, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a scenario 700. In the scenario 700, there is shown a system 102 that includes the circuitry 104 of FIG. 1 and the multimodal fusion network 108 of FIG. 3. There is further shown a plurality of multimodal inputs 702 and a plurality of predicted emotion labels 704.

The plurality of multimodal inputs 702 may include a first multimodal input 702A, a second multimodal input 702B, a third multimodal input 702C, and an Nth multimodal input 702N. The first multimodal input 702A may be associated with a first utterance depicted in one or more videos. The second multimodal input 702B may be associated with a second utterance depicted in such videos. Similarly, the third multimodal input 702C may be associated with a third utterance depicted in such videos and the Nth multimodal input 702N may be associated with an Nth utterance depicted in such videos. All such utterances may be part of a conversation (e.g., a dyadic conversation). Similar to the plurality of multimodal inputs 702, the plurality of predicted emotion labels 704 may include a first predicted emotion label 704A, a second predicted emotion label 704B, a third predicted emotion label 704C, and an Nth predicted emotion label 704N.

The circuitry 104 may be configured to input the first multimodal input 702A to the one or more feature extractors 110. The first multimodal input 702A may be associated with the first utterance and may include a first modality 706 associated with acoustics of the first utterance, a second modality 708 associated with a text transcript of the first utterance, and a third modality 710 associated with a visual aspect of the first utterance.

The circuitry 104 may be further configured to generate input embeddings as output of the one or more feature extractors 110 for the input. The input embeddings include an embedding for each modality of the multimodal input. Details about the input embeddings are provided, for example, FIG. 3.

The circuitry 104 may be further configured to generate a set of emotion-relevant features based on application of the network of transformer encoders on the input embeddings. The set of emotion-relevant features may include one or more features corresponding to each modality of the multimodal input. After the generation of the set of emotion-relevant features, the circuitry 104 may be configured to generate a fused-feature representation of the set of emotion-relevant features. In an embodiment, the fused-feature representation of the set of emotion-relevant features may be generated based on application of the fusion attention network on the set of emotion-relevant features. The circuitry 104 may be further configured to output the first predicted emotion label 704A for the first utterance, based on the application of the output network 116 on the fused-feature representation.

In an embodiment, the aforementioned operations may be performed for the each of the plurality of multimodal inputs 702 to predict a corresponding emotion label for a corresponding multimodal input. For example, the first predicted emotion label 704A for the first utterance may be "Surprise". The sentiment associated with the first predicted emotion label 704A may be "Positive". The second predicted emotion label 704B for the second utterance may be "Joy" and the corresponding sentiment may be "Positive". The third predicted emotion label 704C for the third utterance may be "Neutral" and the corresponding sentiment may be "Neutral". Similarly, the Nth predicted emotion label 704N for the Nth utterance may be "Neutral" and the corresponding sentiment may be "Neutral".

Figure 8:
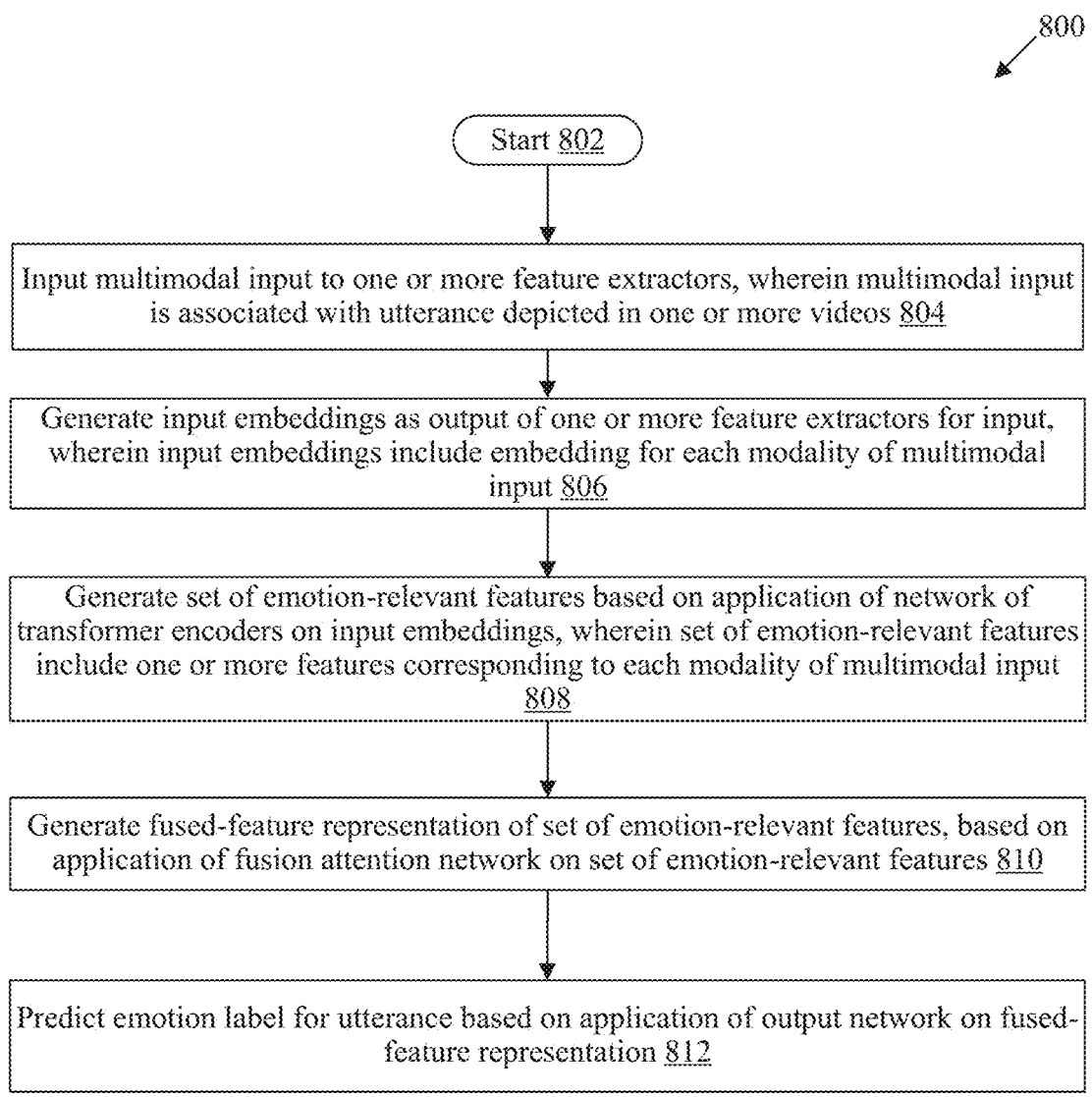
FIG. 8 is a flowchart that illustrates an exemplary method of emotion recognition in multimedia videos using multimodal fusion-based deep neural network, in accordance with an embodiment of the disclosure.

FIG. 8 is a flowchart that illustrates an exemplary method of emotion recognition in multimedia videos using multimodal fusion based deep neural network, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The operations of the flowchart 800 may start at 802 and may proceed to 804.

At 804, the multimodal input may be inputted to the one or more feature extractors 110, wherein the multimodal input may be associated with an utterance depicted in one or more videos. In at least one embodiment, the circuitry 104 may be configured to input the multimodal input to the one or more feature extractors, wherein the multimodal input may be associated with an utterance depicted in one or more videos. Details about the multimodal input are provided, for example, in FIG. 1, FIG. 3, and FIG. 5.

At 806, the input embeddings may be generated as the output of the one or more feature extractors 110 for the input, wherein the input embeddings may include an embedding for each modality of the multimodal input. In at least one embodiment, the circuitry 104 may be configured to generate the input embeddings as the output of the one or more feature extractors for the input, wherein the input embeddings include an embedding for each modality of the multimodal input. Details about the generation of the input embeddings are provided, for example, in FIG. 3.

At 808, the set of emotion-relevant features may be generated based on application of the network of transformer encoders on the input embeddings, wherein the set of emotion-relevant features may include one or more features corresponding to each modality of the multimodal input. In at least one embodiment, the circuitry 104 may be configured to generate the set of emotion-relevant features based on the application of the network of transformer encoders 112 on the input embeddings, wherein the set of emotion-relevant features may include the one or more features corresponding to each modality of the multimodal input. Details about generation of the set of emotion-relevant features are provided, for example, in FIG. 3.

At 810, the fused-feature representation of the set of emotion-relevant features may be generated based on application of the fusion attention network on the set of emotion-relevant features. In at least one embodiment, the circuitry 104 may be configured to generate the fused-feature representation of the set of emotion-relevant features based on application of the fusion attention network on the set of emotion-relevant features. Details about generation of the fused-feature representation are provided, for example, in FIG. 3 and FIG. 5.

At 812, the emotion label for the utterance may be predicted based on application of the output network 116 on the fused-feature representation. In at least one embodiment, the circuitry 104 may be configured to predict the emotion label for the utterance based on application of the output network on the fused-feature representation. Control may pass to end.

Based on experimental data obtained after performing several experiments, the disclosed multimodal fusion network 302 outperformed the state-of-the-art methods with a large margin (i.e., improvement in range of over 9% in terms of weighted average F1 score) when executed on known datasets such as a Multimodal Multi-Party Dataset for Emotion Recognition in Conversation (MELD) dataset and an Interactive Emotional Dyadic Motion Capture (IEMO-CAP) dataset.

Various embodiments of the disclosure may provide a non-transitory computer-readable medium having stored thereon, computer-executable instructions executable by circuitry or a machine to operate a system (e.g., the system 102) for emotion recognition in multimedia videos using multimodal fusion based deep neural network. The computer-executable instructions may cause the machine and/or computer to perform operations that include inputting a multimodal input (e.g., the multimodal input 124) to one or more feature extractors (e.g., the one or more feature extractors 110) of a multimodal fusion network (e.g., the multimodal fusion network 108). The multimodal input may be associated with an utterance depicted in one or more videos. The operations further include generating input embeddings as an output of the one or more feature extractors for the input. The input embeddings may include an embedding for each modality of the multimodal input. The operations may further include generating the set of emotion-relevant features based on application of a network of transformer encoders (e.g., the network of transformer encoders 112) of the multimodal fusion network on the input embeddings. The set of emotion-relevant features include one or more features corresponding to each modality of the multimodal input. The operations may further include generating a fused-feature representation of the set of emotion-relevant features based on application of a fusion attention network (e.g., the fusion attention network 114) of the multimodal fusion network on the set of emotion-relevant features. The operations may further include predicting an emotion label for the utterance based on application of an output network (e.g., the output network 116) of the multimodal fusion network on the fused-feature representation.

Certain embodiments of the disclosure may be found in a system and a method for emotion recognition in multimedia videos using multi-modal fusion based deep neural network. Various embodiments of the disclosure may provide the system 102 that may include the circuitry 104 and memory 106 configured to store the multimodal fusion network 108 which includes one or more feature extractors 110, a network of transformer encoders 112 coupled to the one or more feature extractors 110, a fusion attention network 114 coupled to the network of transformer encoders 112, and the output network 116 coupled to the fusion attention network 114. The circuitry 104 may be configured to input the multimodal input 124 to the one or more feature extractors. The multimodal input may be associated with an utterance depicted in one or more videos. The circuitry 104 may be further configured to generate input embeddings as an output of the one or more feature extractors 110 for the input. The input embeddings may include an embedding for each modality of the multimodal input. The circuitry 104 may be further configured to generate a set of emotion-relevant features based on application of the network of transformer encoders 112 on the input embeddings. The set of emotion-relevant features include one or more features corresponding to each modality of the multimodal input. The circuitry 104 may be further configured to generate the fused-feature representation of the set of emotion-relevant features based on application of the fusion attention network 114 on the set of emotion-relevant features. The circuitry 104 may be further configured to predict the emotion label for the utterance based on application of the output network 310 on the fused-feature representation.

In accordance with an embodiment, the multimodal input 124 includes a multilingual speech and a text transcription of the multilingual speech in a first language that is compatible with the one or more feature extractors. In accordance with an embodiment, the multimodal input includes a speech in a second language that may be different from a first language compatible with the one or more feature extractors 110, and the multimodal input includes a text transcription of the speech in the first language that may be compatible with the one or more feature extractors 110. In accordance with an embodiment, the multimodal input includes the first modality 314A associated with acoustics of the utterance, the second modality 314B associated with a text transcript of the utterance, and the third modality 314C associated with a visual aspect of the utterance.

In accordance with an embodiment, the one or more feature extractors may include the acoustic feature extractor 304B and the acoustic-visual feature extractor 304C, and the circuitry 104 may be further configured to generate a first embedding of the input embeddings based on application of one of the acoustic-visual feature extractor 304C or the acoustic feature extractor 304B on acoustic information of the utterance included in the multimodal input 124.

In accordance with an embodiment, the one or more feature extractors may include the text feature extractor 304C, and the circuitry 104 may be further configured to generate a second embedding of the input embeddings based on application of the text feature extractor 304C on a text transcript of acoustic information associated with the utterance and text transcripts of different utterances that may precede or succeed the utterance in time.

In accordance with an embodiment, the one or more feature extractors may include the visual feature extractor 304D and the acoustic-visual feature extractor 304C, and the circuitry 104 may be further configured to generate a third embedding of the input embeddings based on application of one of the and the acoustic-visual feature extractor 304C or the visual feature extractor 304D on facial information of one or more speaking characters in frames of the one or more videos and scene information associated with frames. The frames may correspond to a duration of the utterance in the one or more videos.

In accordance with an embodiment, the circuitry 104 may be configured to input frames of the one or more videos corresponding to a duration of the utterance to the visual feature extractor 304D. The circuitry 104 may be further configured to detect one or more faces in each of the received frames based on the application of the face detection model 210 of the visual feature extractor 304D on each of the received frames. The circuitry 104 may be further configured to generate one or more bounding boxes that includes the detected one or more faces. The circuitry 104 may be further configured to normalize an area associated with each of the one or more bounding boxes by application of the visual feature extractor 304D. The circuitry 104 may be further configured to generate a third embedding of the input embeddings as the output of the visual feature extractor 304D based on the detected one or more faces and the normalization.

In accordance with an embodiment, the network of transformer encoders 306 may include the first stack 316 of transformer encoders for the first modality 314A of the multimodal input, the second stack 318 of transformer encoders for the second modality 314B of the multimodal input, and the third stack 320 of transformer encoders for the third modality 314C of the multimodal input.

In accordance with an embodiment, the system 102 may further include the skip connection 322 between each pair of adjacent transformer encoders in the network of transformer encoders 306.

In accordance with an embodiment, the circuitry 104 may be configured to receive the one or more videos. The circuitry 104 may be further configured to apply a scene detection model 212 on the received one or more videos. The circuitry 104 may be further configured to extract a plurality of scenes from the one or more videos based on the application of the scene detection model. The circuitry 104 may be further configured to apply the single boundary detection model 214 on each of the extracted plurality of scenes. The circuitry 104 may be further configured to detect a plurality of utterances 312 in the extracted plurality of scenes based on the application of the single boundary detection model 214. The circuitry 104 may be further configured to prepare a sequence of multimodal inputs based on the detection. The multimodal input that may be input to the one or more feature extractors 304 may be part of the prepared sequence of multimodal inputs.

In accordance with an embodiment, the each of set of fusion attention networks 308 may include one or more multi-head attention layers and a first fully connected layer. The input of the first fully connected layer may be coupled to an output of the one or more multi-head attention layers.

In accordance with an embodiment, the circuitry 104 may be further configured to apply one or more multi-head attention layers on the set of emotion-relevant features to determine an inter-feature mapping within the set of emotion-relevant features and concatenate the set of emotion-relevant features into a latent representation of the set of emotion-relevant features based on the inter-feature mapping.

In accordance with an embodiment, the fused-feature representation of the set of emotion-relevant features may be generated further based on application of the first fully connected layer on the latent representation.

In accordance with an embodiment, the output network 310 may include a second fully connected layer coupled to an output of the set of fusion attention networks 308.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A system, comprising:
   a memory configured to store a multimodal fusion network which includes one or more feature extractors, a network of transformer encoders coupled to the one or more feature extractors, a fusion attention network coupled to the network of transformer encoders, and an output network coupled to the fusion attention network; and
   circuitry configured to:
   input a multimodal input to the one or more feature extractors, wherein the multimodal input is associated with an utterance depicted in one or more videos;
   generate, as an output of the one or more feature extractors, input embeddings for the inputted multimodal input, wherein the input embeddings include an embedding for each modality of the multimodal input;
   generate a set of emotion-relevant features based on application of the network of transformer encoders on the input embeddings, wherein the set of emotion-relevant features include one or more features corresponding to each modality of the multimodal input;
   generate a fused-feature representation of the set of emotion-relevant features, based on application of the fusion attention network on the set of emotion-relevant features; and
   predict an emotion label for the utterance, based on application of the output network on the fused-feature representation.

2. The system according to claim 1, wherein the multimodal input includes a multilingual speech and a text transcription of the multilingual speech in a first language that is compatible with the one or more feature extractors.

3. The system according to claim 1, wherein the multimodal input includes a speech in a second language that is different from a first language compatible with the one or more feature extractors, and the multimodal input includes a text transcription of the speech in the first language that is compatible with the one or more feature extractors.

4. The system according to claim 1, wherein the multimodal input includes a first modality associated with acoustics of the utterance, a second modality associated with a text transcript of the utterance, and a third modality associated with a visual aspect of the utterance.

5. The system according to claim 1, wherein the one or more feature extractors comprise an acoustic-visual feature extractor and an acoustic feature extractor and the circuitry is further configured to generate a first embedding of the input embeddings based on application of one of the acoustic-visual feature extractor or the acoustic feature extractor on acoustic information of the utterance included in the multimodal input.

6. The system according to claim 1, wherein the one or more feature extractors comprise a text feature extractor, and the circuitry is further configured to generate a second embedding of the input embeddings based on application of the text feature extractor on a text transcript of acoustic information associated with the utterance and text transcripts of different utterances that precede or succeed the utterance in time.

7. The system according to claim 1, wherein
the one or more feature extractors comprise an acoustic-visual feature extractor and a visual feature extractor,
the circuitry is further configured to generate a third embedding of the input embeddings based on application of one of the acoustic-visual feature extractor or the visual feature extractor on facial information of one or more speaking characters in frames of the one or more videos and scene information associated with the frames, and
the frames correspond to a duration of the utterance in the one or more videos.

8. The system according to claim 7, wherein the circuitry is further configured to:
input the frames of the one or more videos corresponding to a duration of the utterance to the acoustic-visual feature extractor or the visual feature extractor;
detect one or more faces in each of the frames based on the application of a face detection model of the acoustic-visual feature extractor or the visual feature extractor on each of the frames;
generate one or more bounding boxes that includes the detected one or more faces;
normalize, by application of one of the acoustic-visual feature extractor or the visual feature extractor, an area associated with each of the one or more bounding boxes; and
generate a third embedding of the input embeddings as the output of the acoustic-visual feature extractor or the visual feature extractor based on the detected one or more faces and the normalization.

9. The system according to claim 1, wherein the network of transformer encoders for comprises a first stack of transformer encoders for a first modality of the multimodal input, a second stack of transformer encoders for a second modality of the multimodal input, and a third stack of transformer encoders for a third modality of the multimodal input.

10. The system according to claim 1, further comprising a skip connection between each pair of adjacent transformer encoders in the network of transformer encoders.

11. The system according to claim 1, wherein the circuitry is further configured to:
receive the one or more videos;
apply a scene detection model on the received one or more videos;
extract a plurality of scenes from the one or more videos based on the application of the scene detection model;
apply a single boundary detection model on each of the extracted plurality of scenes;
detect a plurality of utterances in the extracted plurality of scenes, based on the application of the single boundary detection model; and
prepare a sequence of multimodal inputs based on the detection, wherein the prepared sequence of multimodal inputs includes the multimodal input that is input to the one or more feature extractors.

12. The system according to claim 1, wherein
the fusion attention network comprises one or more multi-head attention layers and a first fully connected layer, and
an input of the first fully connected layer is coupled to an output of the one or more multi-head attention layers.

13. The system according to claim 12, wherein
the circuitry is further configured to apply one or more multi-head attention layers on the set of emotion-relevant features to:
determine an inter-feature mapping within the set of emotion-relevant features; and
concatenate the set of emotion-relevant features into a latent representation of the set of emotion-relevant features, based on the inter-feature mapping.

14. The system according to claim 13, wherein the fused-feature representation of the set of emotion-relevant features is generated further based on application of the first fully connected layer on the latent representation.

15. The system according to claim 1, wherein the output network comprises a second fully connected layer coupled to an output of the fusion attention network.

16. A method, comprising:
in a system that includes a memory storing a multimodal fusion network:
inputting a multimodal input to one or more feature extractors of the multimodal fusion network, wherein the multimodal input is associated with an utterance depicted in one or more videos;
generating, as an output of the one or more feature extractors, input embeddings for the inputted multimodal input, wherein the input embeddings include an embedding for each modality of the multimodal input;
generating a set of emotion-relevant features based on application of a network of transformer encoders of the multimodal fusion network on the input embeddings, wherein the set of emotion-relevant features include one or more features corresponding to each modality of the multimodal input;
generating a fused-feature representation of the set of emotion-relevant features, based on application of a fusion attention network of the multimodal fusion network on the set of emotion-relevant features; and
predicting an emotion label for the utterance, based on application of an output network of the multimodal fusion network on the fused-feature representation.

17. The method according to claim 16, wherein the multimodal input includes a first modality associated with acoustics of the utterance, a second modality associated with a text transcript of the utterance, and a third modality associated with a visual aspect of the utterance.

18. The method according to claim 16, wherein
the fusion attention network comprises one or more multi-head attention layers and a first fully connected layer, and
an input of the first fully connected layer is coupled to an output of the one or more multi-head attention layers.

19. The method according to claim 18, further comprising applying one or more multi-head attention layers on the set of emotion-relevant features to:
determine an inter-feature mapping within the set of emotion-relevant features; and concatenate the set of emotion-relevant features into a latent representation of the set of emotion-relevant features, based on the inter-feature mapping, wherein the fused-feature representation of the set of emotion-relevant features is generated further based on application of the first fully connected layer on the latent representation.

20. A non-transitory computer-readable medium having stored thereon, computer-executable instructions that when executed by circuitry of a system, causes the circuitry to execute operations, the operations comprising:
- inputting a multimodal input to one or more feature extractors of a multimodal fusion network, wherein the multimodal input is associated with an utterance depicted in one or more videos;
- generating, as an output of the one or more feature extractors, input embeddings for the inputted multimodal input, wherein the input embeddings include an embedding for each modality of the multimodal input;
- generating a set of emotion-relevant features based on application of a network of transformer encoders of the multimodal fusion network on the input embeddings, wherein the set of emotion-relevant features include one or more features corresponding to each modality of the multimodal input;
- generating a fused-feature representation of the set of emotion-relevant features, based on application of a fusion attention network of the multimodal fusion network on the set of emotion-relevant features; and
- predicting an emotion label for the utterance, based on application of an output network of the multimodal fusion network on the fused-feature representation.

* * * * *